United States Patent
Wood et al.

(10) Patent No.: US 10,641,647 B2
(45) Date of Patent: *May 5, 2020

(54) MOUNTING ASSEMBLY FOR A WEIGHING DEVICE

(71) Applicant: Artico, L.L.C., Buchanan, MI (US)

(72) Inventors: Brian Wood, Saint Joseph, MI (US); Aaron Stewart, Buchanan, MI (US)

(73) Assignee: Artico, L.L.C., Buchanan, MI (US)

( * ) Notice: Subject to any disclaimer, the term of this patent is extended or adjusted under 35 U.S.C. 154(b) by 252 days.

This patent is subject to a terminal disclaimer.

(21) Appl. No.: 15/795,648

(22) Filed: Oct. 27, 2017

(65) Prior Publication Data

US 2019/0049289 A1 Feb. 14, 2019

Related U.S. Application Data

(63) Continuation-in-part of application No. 15/671,350, filed on Aug. 8, 2017, now Pat. No. 10,371,565.

(51) Int. Cl.
*G01G 21/23* (2006.01)
*G01G 21/28* (2006.01)
*G01G 19/44* (2006.01)
*F16M 11/12* (2006.01)
*F16M 13/02* (2006.01)

(52) U.S. Cl.
CPC ............ *G01G 21/23* (2013.01); *G01G 19/44* (2013.01); *G01G 21/28* (2013.01); *F16M 11/12* (2013.01); *F16M 13/022* (2013.01)

(58) Field of Classification Search
CPC ........ G01G 21/23; G01G 21/28; G01G 19/44; F16M 11/12; F16M 13/022
See application file for complete search history.

(56) References Cited

U.S. PATENT DOCUMENTS

| | | | |
|---|---|---|---|
| 2,872,178 | A | 2/1959 | Holland |
| 2,924,443 | A | 2/1960 | Townsend et al. |
| 3,027,215 | A | 3/1962 | Duncan |
| 3,097,712 | A | 7/1963 | Johnson |
| 4,288,131 | A | 9/1981 | Griffin |
| 4,351,505 | A | 9/1982 | Wickersham |
| 5,612,515 | A | 3/1997 | Eisen |
| 6,441,323 | B1 | 8/2002 | Montagnino et al. |
| 10,371,565 | B2 * | 8/2019 | Wood ............... G01G 21/23 |
| 2011/0198133 | A1 | 8/2011 | Chen |

(Continued)

FOREIGN PATENT DOCUMENTS

| | | |
|---|---|---|
| JP | 06084318 U | 12/1994 |
| JP | 07198468 A | 8/1995 |

OTHER PUBLICATIONS

The International Search Report and Written Opinion for PCT Application No. PCT/US2018/045584, dated Nov. 28, 2018.

*Primary Examiner* — Randy W Gibson

(74) *Attorney, Agent, or Firm* — Carlson, Gaskey & Olds, P.C.

(57) ABSTRACT

A mounting assembly for a weighing device according to an exemplary aspect of the present disclosure includes, among other things, a vertical structure mount, a first link attached to the vertical structure mount, a second link for attachment to a weighing device, a third link pivotably attached to one of the first link and second link, and a fourth link pivotably attached to one of the first and second link.

19 Claims, 20 Drawing Sheets

(56) References Cited

U.S. PATENT DOCUMENTS

| | | |
|---|---|---|
| 2013/0161465 A1 | 6/2013 | Huang |
| 2014/0135994 A1* | 5/2014 | Bhatt ..................... A47B 88/00 700/275 |
| 2015/0136926 A1 | 5/2015 | Kuo et al. |
| 2019/0219220 A1* | 7/2019 | Chou ..................... F16M 11/12 |

* cited by examiner

MOUNTING ASSEMBLY FOR A WEIGHING DEVICE

CROSS-REFERENCE TO RELATED APPLICATION

This application is a continuation-in-part of application Ser. No. 15/671,350, which was filed on Aug. 8, 2017.

BACKGROUND

The present disclosure relates generally to a mounting assembly for a weighing device, such that the weighing device may not occupy a horizontal surface when not in use. Traditional weighing devices occupy a horizontal surface, such as a floor, when in use.

SUMMARY

A mounting assembly for a weighing device according to an exemplary aspect of the present disclosure includes, among other things, a vertical structure mount, a first link attached to the vertical structure mount, a second link for attachment to a weighing device, a third link pivotably attached to one of the first link and second link, and a fourth link pivotably attached to one of the first and second link.

In a further non-limiting embodiment of the foregoing assembly, the second link is configured for attachment to an upper weighing surface of the weighing device.

In a further non-limiting embodiment of any of the foregoing assemblies, a bracket is included for attaching the second link to the weighing device.

In a further non-limiting embodiment of any of the foregoing assemblies, a fifth link is pivotably attached to the second link.

In a further non-limiting embodiment of any of the foregoing assemblies, a sixth link is pivotably attached to the second link.

A method for mounting a weighing device to a vertical structure, according to an exemplary aspect of the present disclosure includes, among other things, attaching a mounting assembly to the weighing device, wherein the mounting assembly comprises a vertical structure mount, a first link attached to the vertical structure mount, a second link for attachment to the weighing device, a third link pivotably attached to the first link, and a fourth link pivotably attached to the first link, placing a weighing device on a horizontal surface a distance from a vertical structure, and attaching the vertical structure mount to the vertical structure.

A method for mounting a weighing device to a vertical structure, according to an exemplary aspect of the present disclosure includes, among other things, attaching a bracket to a weighing device, attaching the bracket to a mounting assembly, wherein the mounting assembly comprises a vertical structure mount, a first link within the vertical structure mount, a second link for attachment to the weighing device, a third link pivotably attached to the first link, and a fourth link pivotably attached to the first link, and attaching the vertical structure mount to the vertical structure.

DETAILED DESCRIPTION

Figure 1:
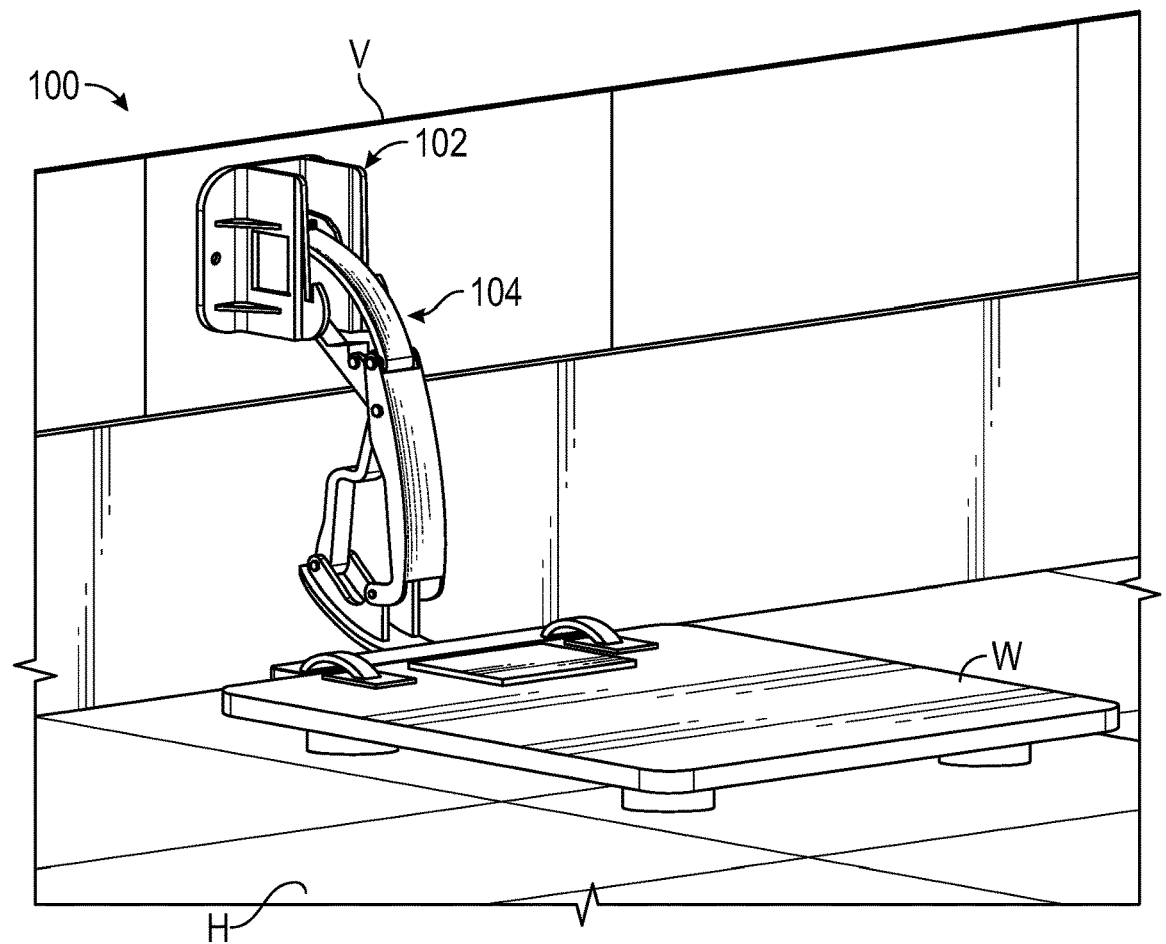
FIG. 1 illustrates a perspective view of an example mounting assembly for a weighing device in a down position.
Figure 5:
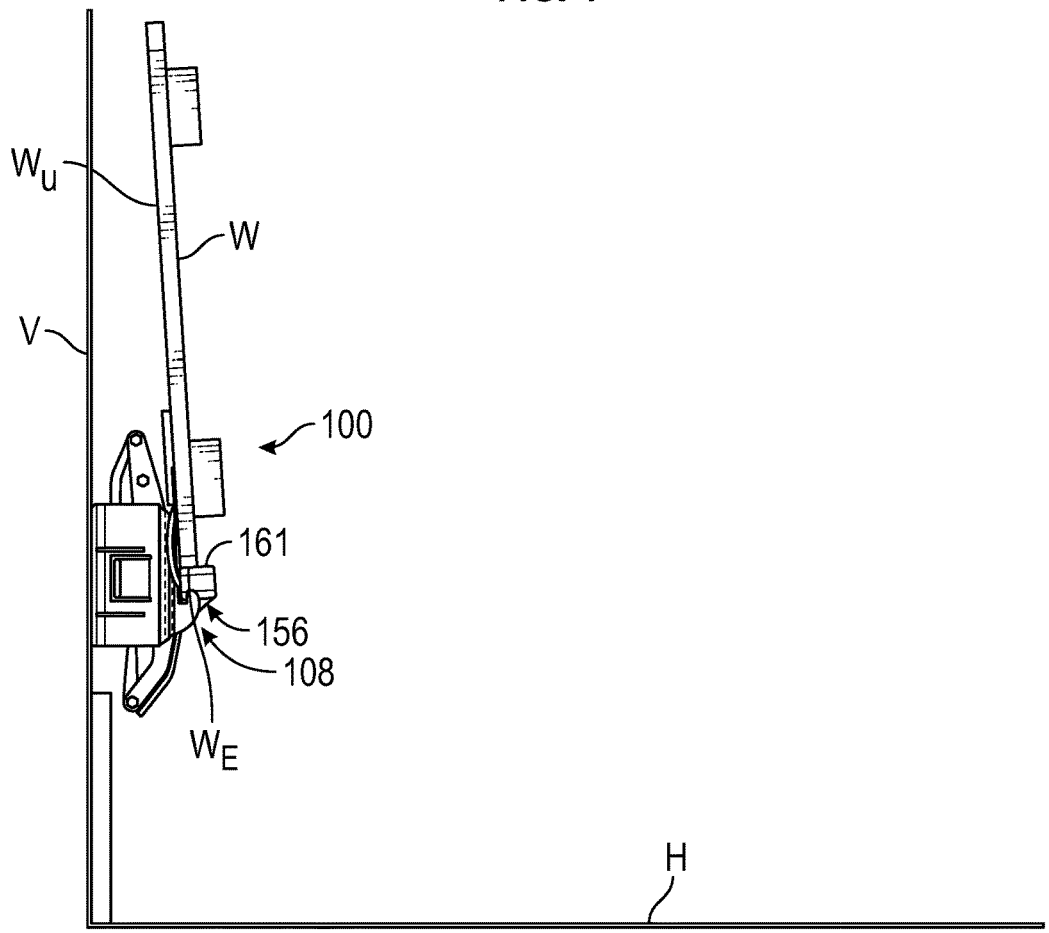
FIG. 5 illustrates a side view of the example mounting assembly for a weighing device in an upright stowed position.

FIG. 1 illustrates a mounting assembly 100 for a weighing device W. In one example, the weighing device W is a weight scale. The assembly 100 includes a vertical structure mount 102 configured for attachment to a vertical structure V, one example being a surface of a wall. A mechanism 104 is fixed to the vertical structure mount 102 and to a weighing device W. The mechanism 104 is configured to guide the raising and lowering of the weighing device W from and to a horizontal surface H, one example being a floor, between a down position (shown) and an upright stowed position (FIG. 5).

Figure 2:
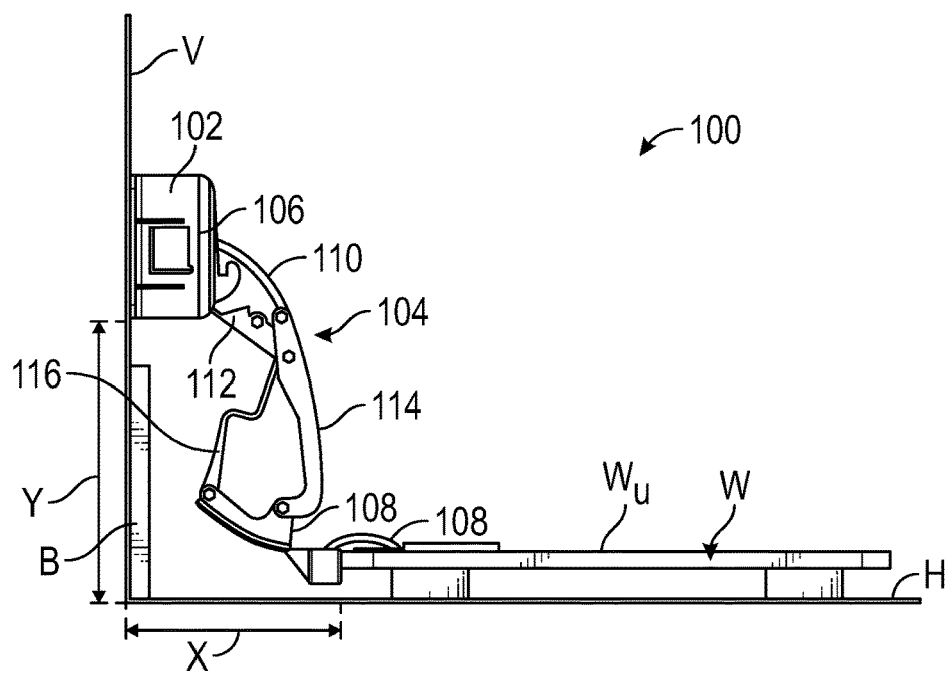
FIG. 2 illustrates a side view of the example mounting assembly for a weighing device in the down position.
Figure 3:
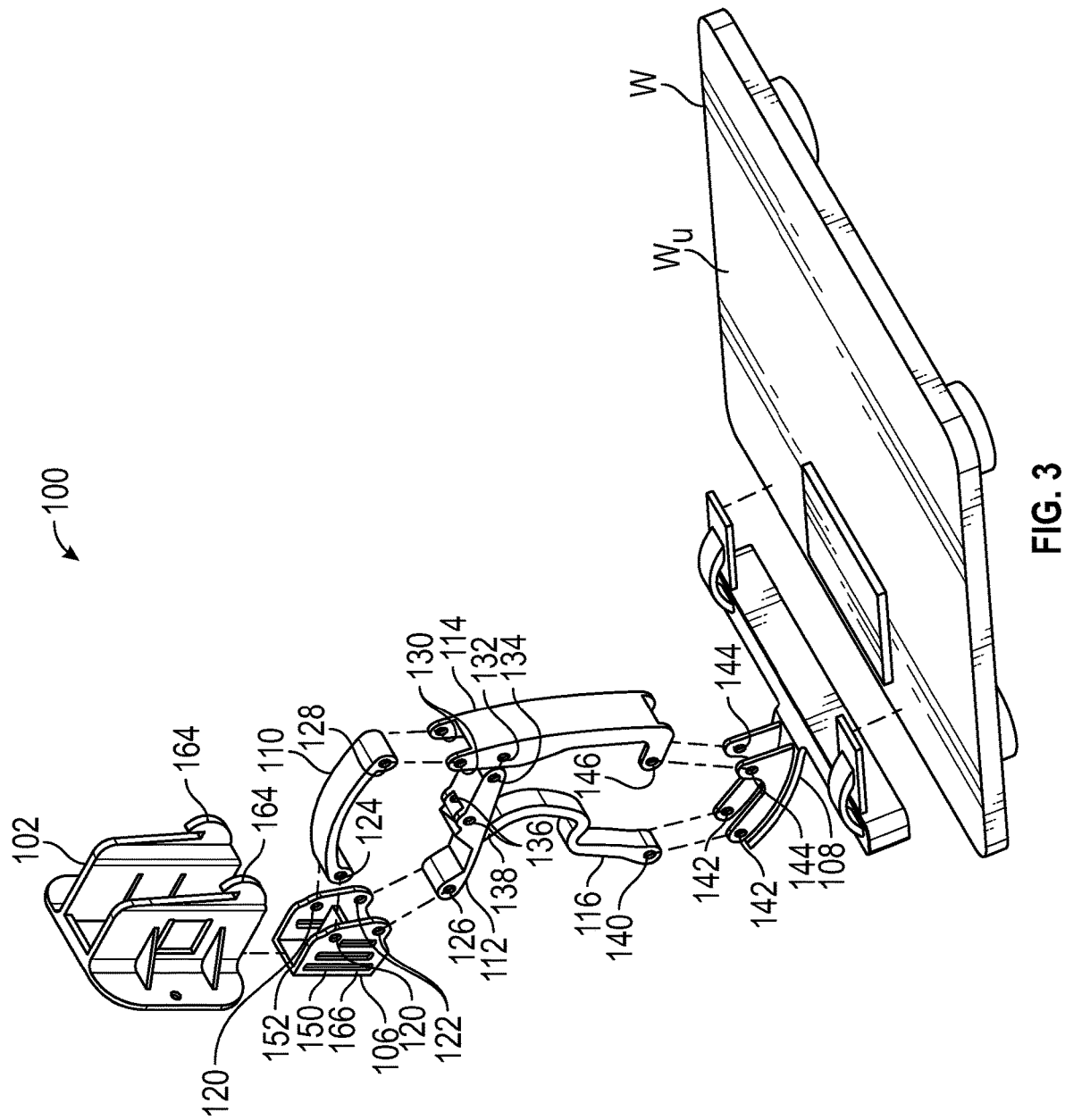
FIG. 3 illustrates an exploded view of the example mounting assembly for a weighing device.

Referring to FIGS. 2 and 3, the mechanism 104 includes a first link 106 attached to the vertical structure mount 102. A second link 108 is configured for attachment to the weighing device W. A third link 110 is pivotably attached to the first link, and a fourth link 112 is pivotably attached to the first link 106. In one example, the second link 108 is configured for attachment to an upper weighing surface Wu of the weighing device, such that the assembly may be used universally with existing weighing devices. Attachment to the upper weighing surface Wu of the weighing device W allows for accurate readings by not distorting the readings of the weighing device W through interference with its balance on the horizontal surface H. Attachment to other surfaces of the weighing device W is contemplated.

A fifth link 114 is pivotably attached to the second link 108, and a sixth link 116 is pivotably attached to the second link 108. The third link 110 is pivotably attached to the fifth link 114, and the fourth link 112 is pivotably attached to the fifth link 114 and the sixth link 116. In some examples, the links 106, 108, 110, 112, 114, and 116 may be pivotably attached at pivot joints by rivets or pins.

The assembly 100 is shown in a down position in FIG. 2, such that the weighing device W is displaced a horizontal distance X along the horizontal surface H from the vertical structure V, and the vertical structure mount 102 is displaced a vertical distance Y along the vertical structure V from the horizontal surface H. In one example, the values for X and Y are great enough such that the assembly 100 can clear a baseboard B or other object on the vertical structure V. In one example, X is at least about 3 inches and Y is at least about 5 inches. The value for X may be great enough such that a user of the weighing device W is spaced an appropriate distance from the vertical structure V when using the weighing device W.

FIG. 3 illustrates an exploded view of the example assembly 100. The first link 106 includes a first pair of openings 120 and a pair of openings 122. The pair of openings 120 are configured to align with a pair of openings 124 on the third link 110 to form a pivot joint for pivotal attachment. The pair of openings 122 are configured to align with a pair of openings 126 on the fourth link 112 to form a pivot joint for pivotal attachment. The third link 110 includes a pair of openings 128 configured to align with a pair of openings 130 on the fifth link 114 to form a pivot joint for pivotal attachment. The fifth link 114 includes a pair of openings 132 configured to align with a pair of openings 134 in the fourth link 112 to form a pivot joint for pivotal attachment. The fourth link includes a pair of openings 136 configured to align with a pair of openings 138 in the sixth link 116 to form a pivot joint for pivotal attachment. The sixth link 116 includes a pair of openings 140 configured to align with a pair of openings 142 in the second link 108 to form a pivot joint for pivotal attachment. The second link 108 includes a pair of openings 144 configured to align with a pair of openings 146 in the fifth link 114 to form a pivot joint for pivotal attachment.

The pair of openings 124 and the pair of openings 128 are located at opposite ends of the third link 110. The pair of openings 126 and the pair of openings 134 are located at opposite ends of the fourth link 112, with the pair of openings 136 located between the pair of openings 126 and the pair of openings 134. The pair of openings 130 and the pair of openings 146 are located at opposite ends of the fifth link 114, and the pair of openings 132 are located between the pair of openings 130 and the pair of openings 146. The pair of openings 138 and the pair of openings 140 are located at opposite ends of the sixth link 116. The pair of openings 120 are vertically above the pair of openings 122.

The first link 106 may include one or more sidewalls 150 extending from a base wall 152. The end of the third link 110 having the openings 124 and the end of the fourth link 112 having the openings 126 are configured to be received between the sidewalls 150 of the first link 106, allowing for a compact assembly 100 in the upright stowed and down positions.

Figure 4:
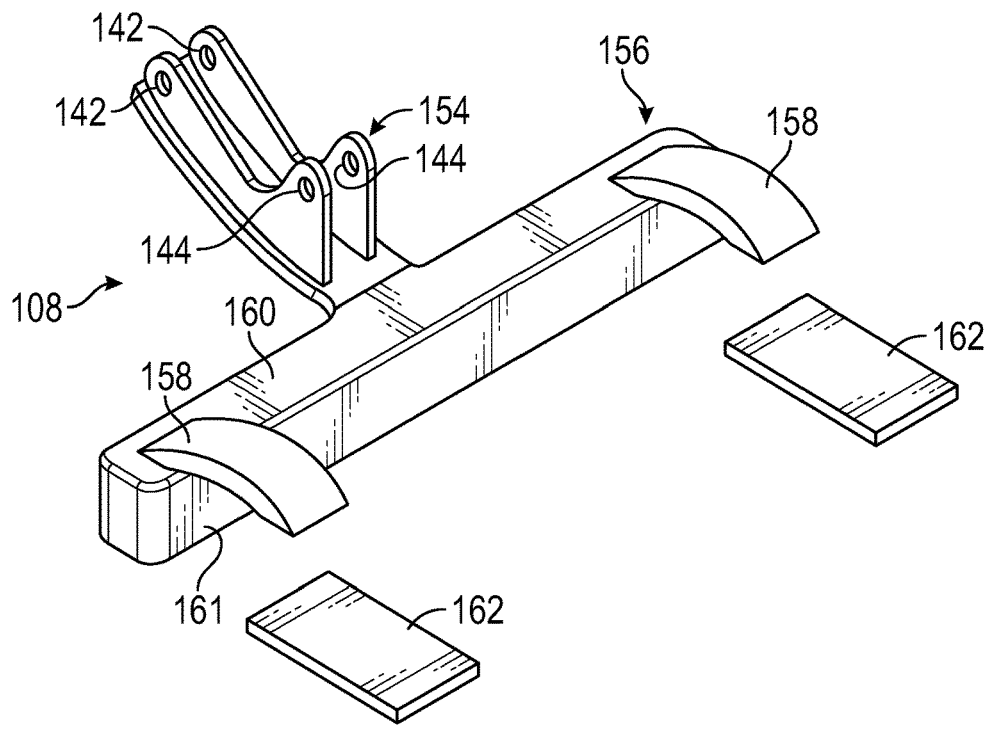
FIG. 4 illustrates a perspective view of an example second link of the example mounting assembly for a weighing device.

FIG. 4 illustrates an example second link 108, including a linking portion 154 with pairs of openings 142, 144. The linking portion 154 is attached to an arm portion 156. A pair of extensions 158 extend from an upper surface 160 of the arm portion 156. The extensions 158 are configured to receive a pair of adhesive pads 162 for attaching the second link 108 to an upper weighing surface Wu of the weighing device W. In one example, the extensions 158 include a concave undersurface configured to face the weighing device W. Although two extensions 158 are shown in the example, more or fewer extensions are contemplated.

FIG. 5 shows the assembly 100 in the stowed upright position, in which the weighing device W is displaced vertically from the horizontal surface H, and the upper weighing surface Wu faces the vertical structure V. For example, the weighing device W may rotate from the down position to the upright stowed position to be parallel with the vertical structure V or rotate past a position parallel with the vertical structure V. As one example, the weighing device W may be 4 degrees past parallel with the vertical structure V in the upright stowed position. In one example, the arm portion 156 of the second link 108 includes a surface 161 extending from the upper surface 160 configured to abut an edge surface WE of the weighing device W to provide upward support to the weighing device W when the assembly 100 is in the upright stowed position. The assembly 100 may utilize a locking feature or features to maintain the assembly 100 in the stowed upright position.

Figure 6:
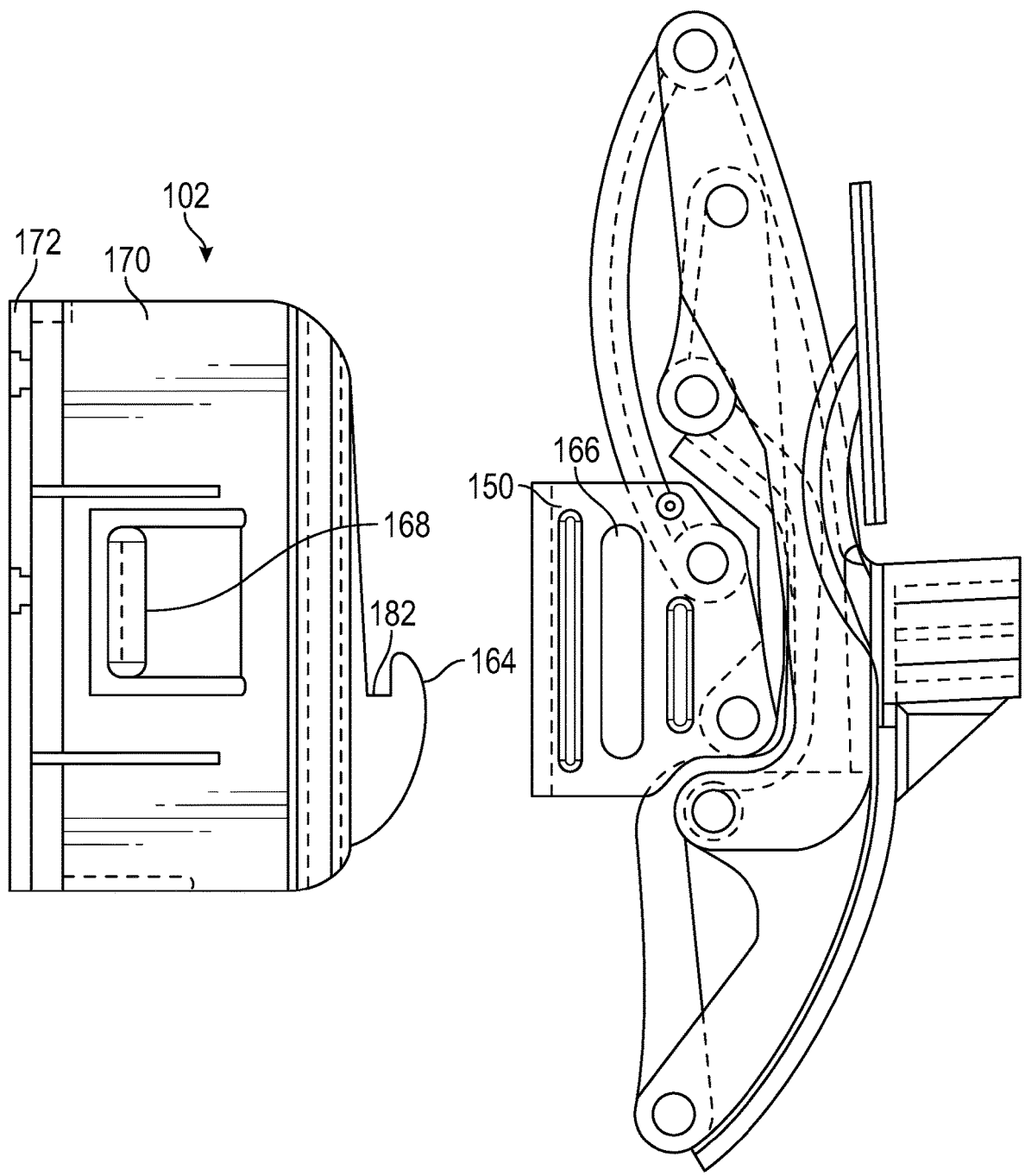
FIG. 6 illustrates a side view of a vertical structure mount and a mechanism of the example mounting assembly for a weighing device.

Referring to FIG. 6, as one example locking feature, the vertical structure mount 102 may include one or more hooks 164 for engaging the mechanism 104 when the weighing device W is in a vertical position. In the example, the first link 106 is vertically movable within the vertical structure mount 102. One or more of the sidewalls 150 of the first link 106 may include one or more vertically oriented slots 166 for engaging one or more tabs 168 in the vertical structure mount 102 to allow for vertical displacement of the first link 106 within the vertical structure mount 102. The vertical movability of the first link 106 may be used for engagement and disengagement of the mechanism 104 with the hooks 164, one example of which is explained further below.

The vertical structure mount 102 may include one or more walls 170 extending from an engagement portion 172 configured to attach to the vertical structure V. The first link 106 is received within the vertical structure mount 102, such that the sidewalls 150 are aligned with the walls 170. The hooks 164 are provided on or monolithic with the walls 170 and are opposite the walls 170 from the engagement portion 172. In the upright or stowed position, all or a substantial portion of the mechanism 104 is provided in the space between the walls 170 to protect the mechanism 104 or hide the mechanism 104 from view.

Figure 7B:
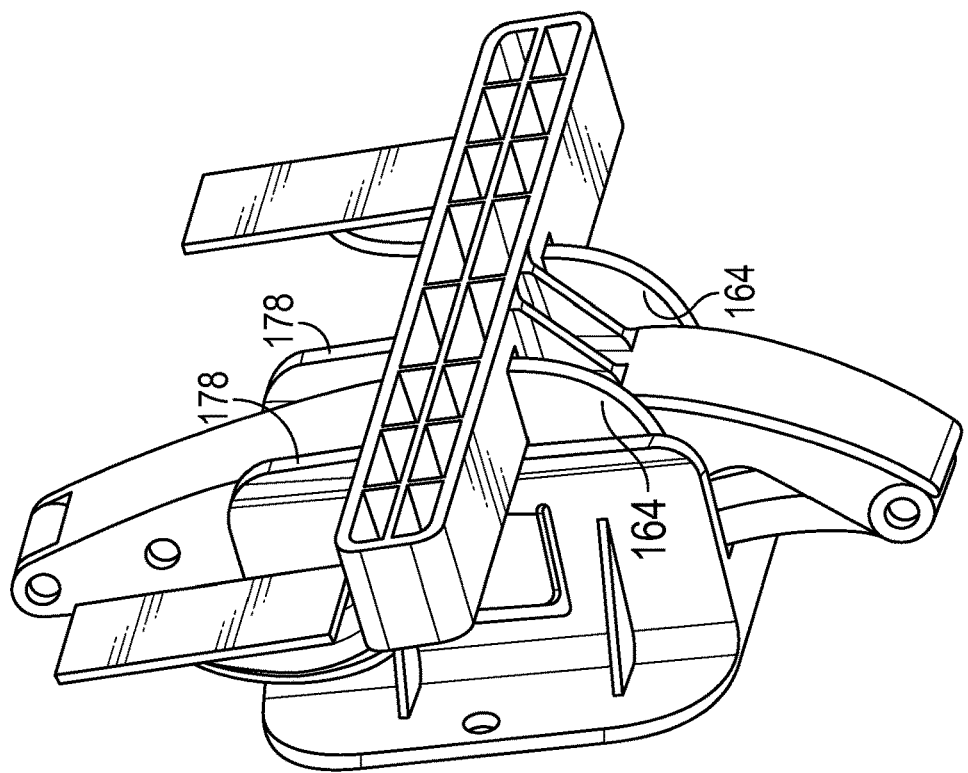
FIG. 7B illustrates a perspective view of the vertical structure mount and the mechanism of the example mounting assembly for a weighing device in an engaged position.
Figure 7A:
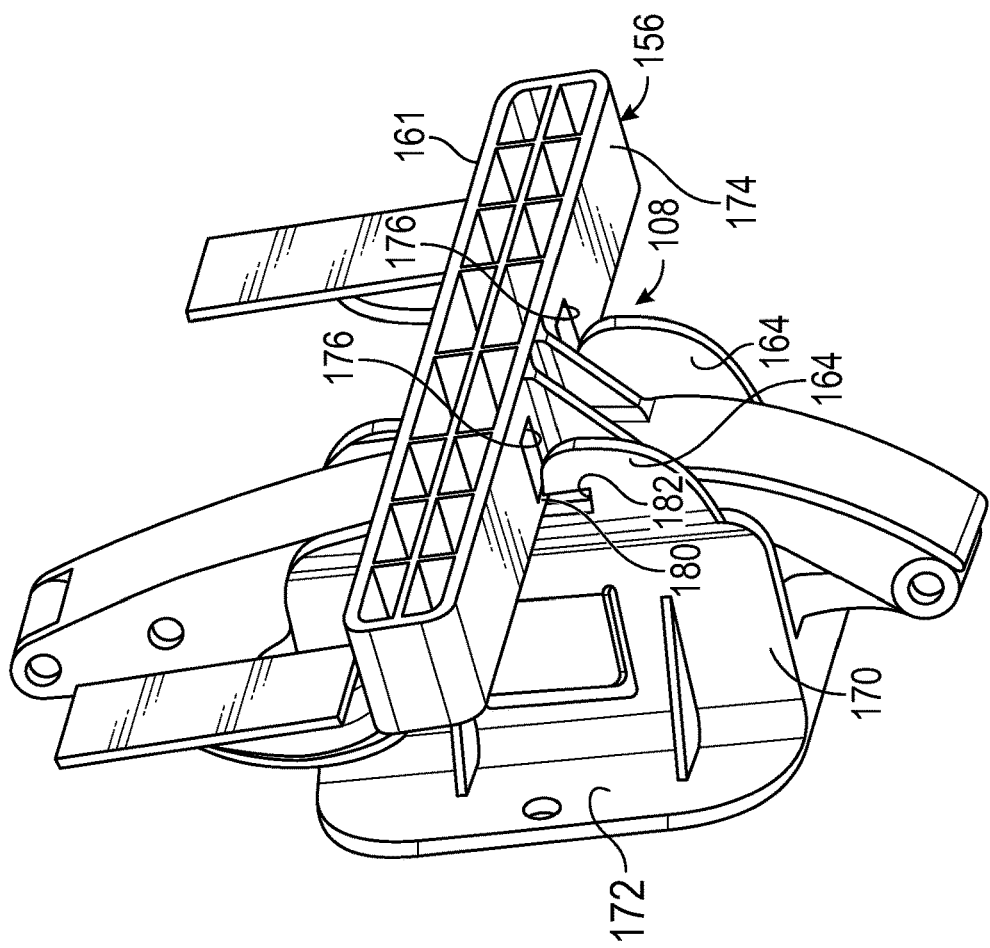
FIG. 7A illustrates a perspective view of the vertical structure mount and the mechanism of the example mounting assembly for a weighing device in a disengaged position.

FIG. 7A illustrates the mechanism 104 disengaged from the hooks 164, and FIG. 7B illustrates the mechanism 104 engaged with the hooks 164. The second link 108 includes a surface 174 opposite the surface 161 having one or more slots 176 configured to receive the one or more hooks 164. In the engaged position, the surface 160 (see FIG. 4) of the second link 108 is received against one or more edge surfaces 178 of the walls 170 when the hooks 164 are received within the slots 176. Portions 180 of the surface 174 between the slots 176 and the surface 161 are received against surfaces 182 between the hooks 164 and the edge surfaces 178 in the engaged position to provide an upward force on the mechanism 104. The hooks 164 may also provide an upward force in the engaged position. The hooks 164 are configured to engage the slots 176 prevent rotation of the mechanism 104 from the upward stowed position to the downward position. In another example, the second link 108 may include the hooks and the vertical structure mount 102 may include the slots.

An upward lifting force on the mechanism 104, one example being an upward force applied to the surface 174 of the second link 108, results in vertical displacement of the first link 106 within the vertical structure mount 102, thereby allowing the second link 108 to disengage from the hooks 164 for movement of the weighing device W into the down position. In one example, the first link 106 is movable in the vertical direction by approximately ½ inch. This distance may be slightly greater than the vertical distance from the surface 182 to the top of the hook 164, to allow for clearance of the hook 164 when moving from the engaged to the disengaged position.

Figure 8A:
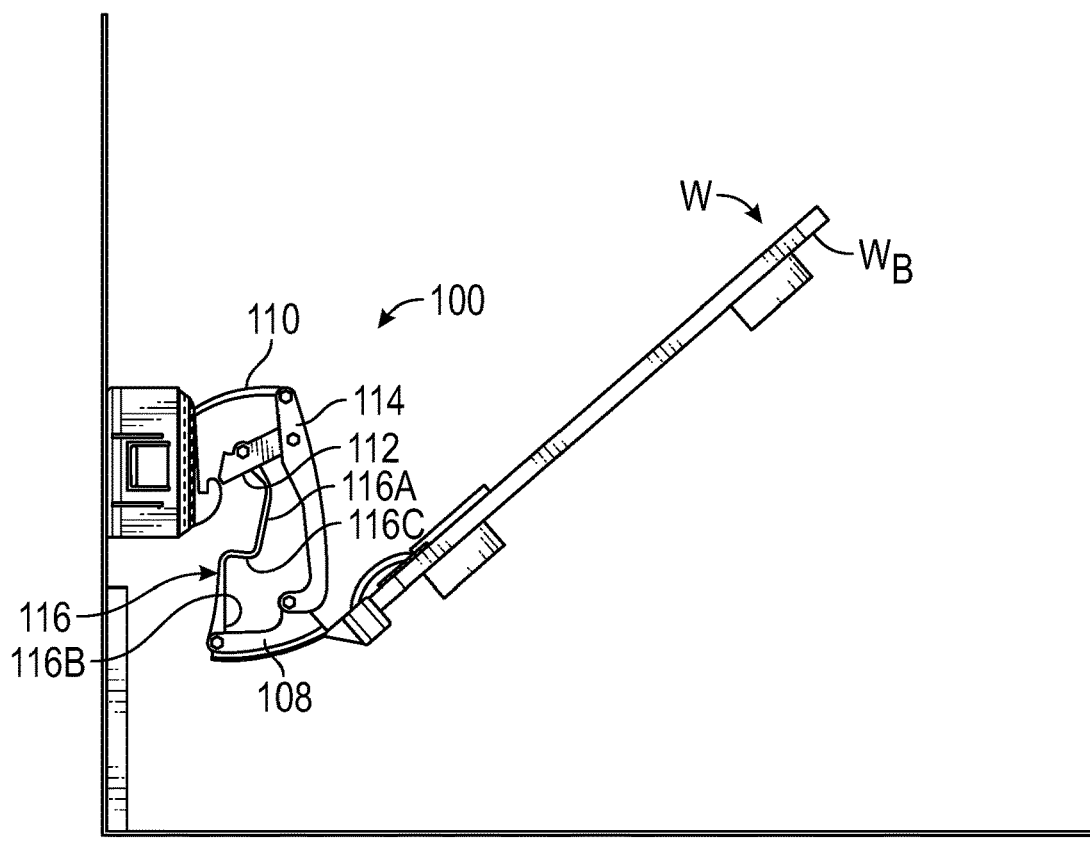
FIG. 8A illustrates a side view of the example mounting assembly for a weighing device in a position between the down position and the upright stowed position.
Figure 8B:
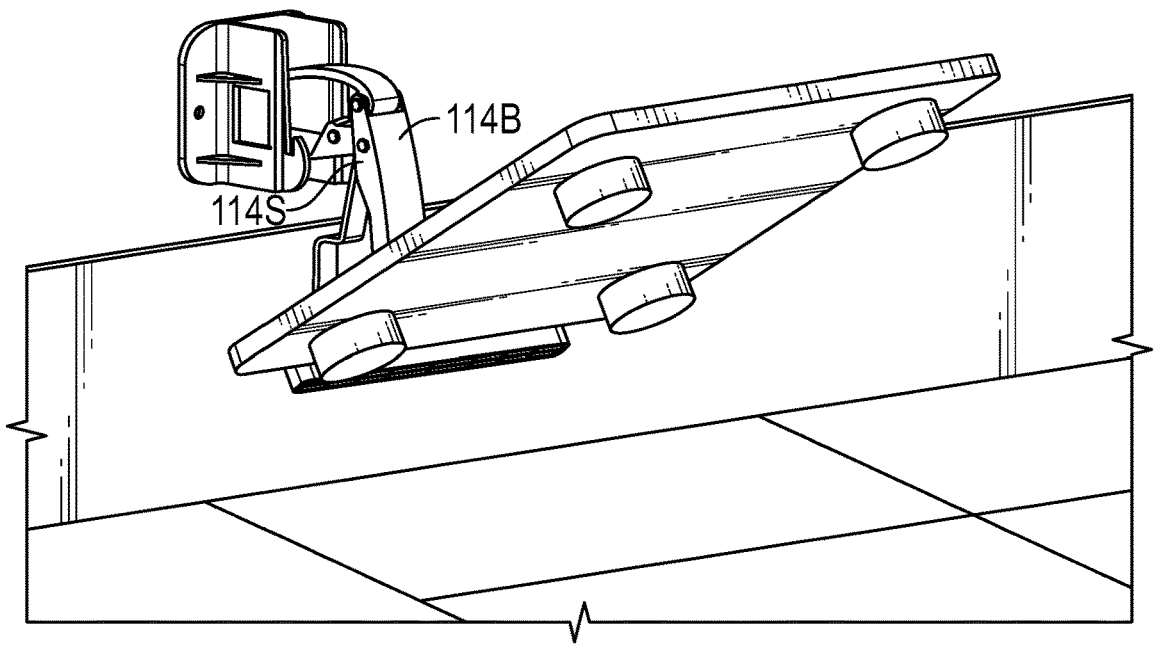
FIG. 8B illustrates a perspective view of the example mounting assembly for a weighing device in a position between the down position and the upright stowed position.

FIGS. 8A and 8B illustrate the assembly 100 at a position between the down and upright stowed positions. A force applied to the bottom surface $W_B$ of the weighing device W would move the assembly 100 toward the upright stowed position, while an absence of force to the bottom surface WB of the weighing device W would allow the assembly 100 to move to the down position, such that the weighing device W engages the horizontal surface W.

In the example, the fifth link 114 wider than the links 110, 112, and 116. The fifth link 114 includes a base 114B and one or more sidewalls 114S extending from the base. The sidewalls 114S provide the pairs of openings 130, 132, 146. In the upright stowed position, with reference to FIG. 6, portions of the links 110, 112, and 116 fit between the sidewalls 114S to provide a compact assembly 100. The sixth link 116 includes a first portion 116A offset from a second portion 116B by a third portion 116C. In the upright stowed position, the first portion 116A is configured to fit between the sidewalls 114S of the fifth link 114, while the third portion 116C provides clearance around the pivot joint provided by the pairs of openings 144, 146. The mechanism 104 is a compact assembly in the upright stowed position.

The extensions 158 of the second link are spaced apart, such that the fifth link 114 and the walls 170 may be located between them when the assembly 100 is in the upright position. The spacing apart of the extensions 158 also allows for attachment to the upper weighing surface Wu without interfering with a display on the weighing device W.

The links 106, 108, 110, 112, 114, 116 are configured to bear the weight of weighing device W when the assembly 100 is in the upright stowed position and each position between the upright stowed and down positions.

Figure 9:
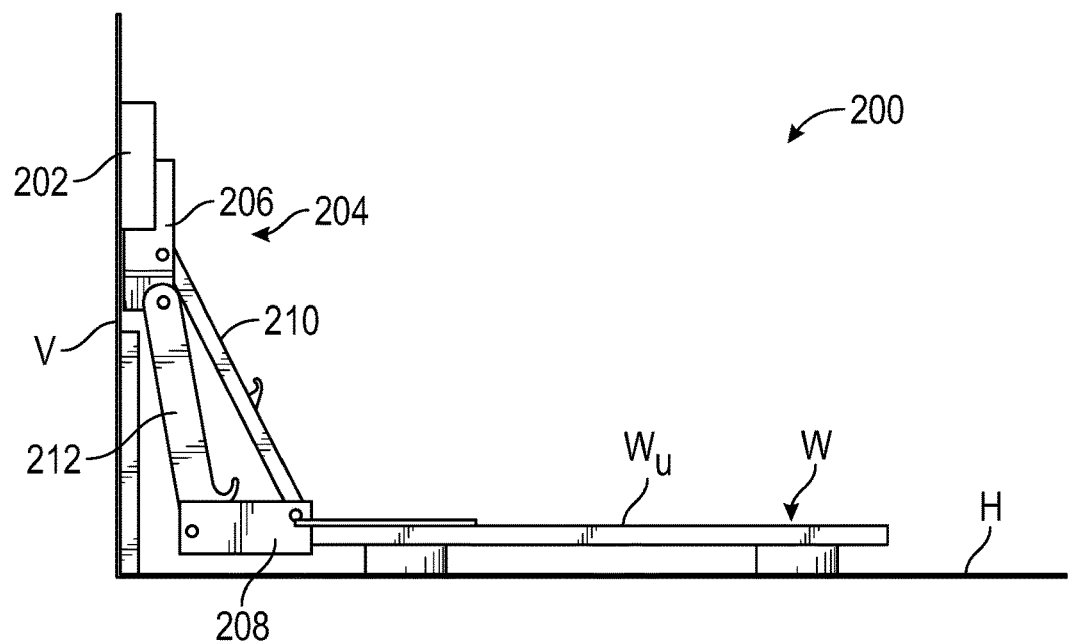
FIG. 9 illustrates a side view of a second example mounting assembly for a weighing device in the down position.

FIGS. 9-12 illustrate a second example mounting assembly 200 for a weighing device W. Referring to FIG. 9, the assembly 200 includes a vertical structure mount 202 configured for attachment to a vertical structure V, one example being a surface of a wall. A mechanism 204 is fixed to the vertical structure mount 202 and to a weighing device W. The mechanism 204 is configured to guide the raising and lowering of the weighing device W from and to a horizontal surface H, one example being a floor.

Figure 10:
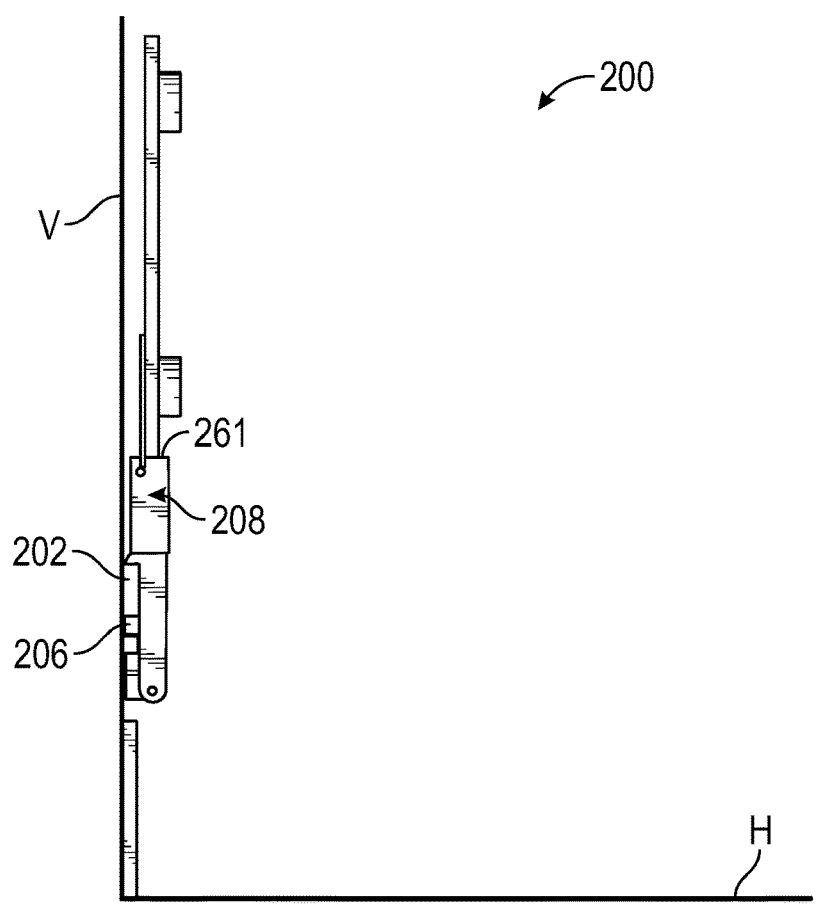
FIG. 10 illustrates a side view of the second example mounting assembly for a weighing device in an upright stowed position.

The mechanism 204 includes a first link 206 attached to the vertical structure mount 202. A second link 208 is configured for attachment to the weighing device W. A third link 210 is pivotably attached to the first link 206 and the second link 208, and a fourth link 212 is pivotably attached to the first link 206 and the second link 208. In one example, the second link 208 is configured for attachment to an upper weighing surface Wu of the weighing device W. FIG. 9 illustrates the assembly 200 in a down position, where the weighing device W is on a horizontal surface H, and FIG. 10 illustrates the assembly in the upright stowed position.

Figure 11:
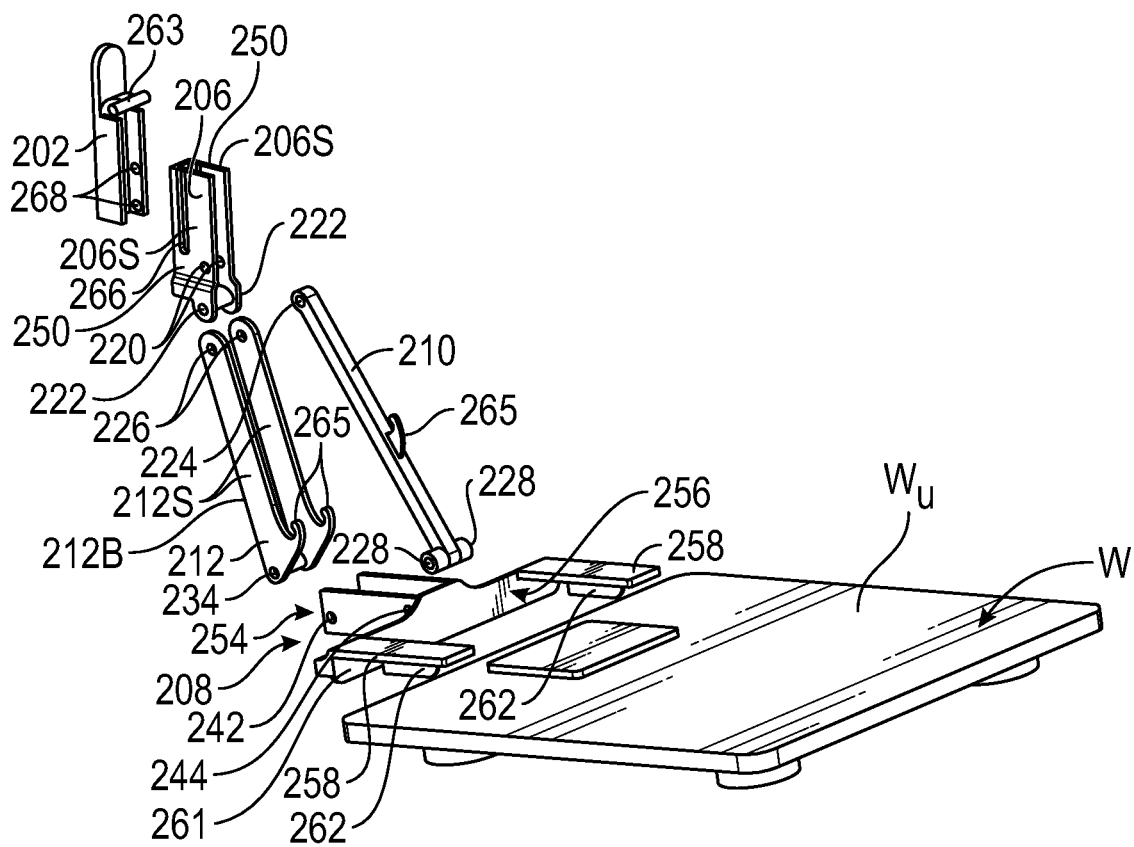
FIG. 11 illustrates an exploded view of the second example mounting assembly for a weighing device.

Referring to FIG. 11, the first link 206 includes a pair of openings 220 vertically above a pair of openings 222. The pair of openings 220 are configured to align with a pair of openings 224 in the third link 210 to form a pivot joint for pivotal attachment. The pair of openings 222 are configured to align with a pair of openings 226 in the fourth link 212 to form a pivot joint for pivotal attachment. A pair of openings 228 in the third link 210 are configured to align with a pair of openings 244 in the second link 208 to form a pivot joint for pivotal attachment. A pair of openings 234 in the fourth link 212 are configured to align with a pair of openings 242 in the second link 208 to form a pivot joint for pivotal attachment.

The pair of openings 224 and the pair of openings 228 are at opposite ends of the third link 210. The pair of openings 226 and the pair of openings 234 are at opposite ends of the fourth link 212.

In an example second link 208, a linking portion 254 includes pairs of openings 242, 244. The linking portion 254 is attached to an arm portion 256. A pair of extensions 258 extend from the arm portion 256. The extensions 258 are configured to receive a pair of adhesive pads 262 for attaching the second link 208 to an upper weighing surface Wu of the weighing device W. Although two extensions 258 are shown in the example, more or fewer extensions are contemplated.

FIG. 10 shows the assembly 200 in the stowed upright position, in which the weighing device W is displaced vertically from the horizontal surface H, and the upper weighing surface Wu faces the vertical structure V. For example, the weighing device W may rotate from the down position to the upright stowed position to be parallel with the vertical structure V or rotate past a position parallel with the vertical structure V. In one example, the arm portion 256 of the second link 208 includes a surface 261 configured to abut an edge surface WE of the weighing device W to provide upward support to the weighing device W when the assembly 200 is in the upright stowed position. The assembly 200 may utilize a locking feature or features to maintain the assembly 200 in the stowed upright position.

As one example locking feature, the vertical structure mount 202 may include a bar 263 to engage one or more hooks 265 of the mechanism 204 while the assembly 200 is in the vertical stowed position. The bar 263 may be vertically above the pairs of openings 220, 222. In the example, the third link 210 includes a hook 265, and the fourth link 212 includes two hooks 265. More or fewer hooks 265 are contemplated.

For engagement and disengagement of the hooks 265, the first link 206 is vertically movable within the vertical structure mount 202. One or more of the sidewalls 250 of the first link 206 may include one or more vertically oriented slots 266 for engaging one or more pins 268 in the vertical structure mount 202 to allow for vertical displacement of the first link 206 within the vertical structure mount 202. The vertical movability of the first link 206 may be used for engagement and disengagement of the hooks 265 and the bar 263. In one example, the first link 206 is vertically movable ½ inch within the vertical structure mount 202.

The assembly 200 is a compact assembly. In the example, the fourth link 212 wider than the links 206, 210. The fourth link 212 includes a base 212B and one or more sidewalls 212S extending from the base. The sidewalls 212S provide the pairs of openings 226, 234. In the upright stowed position, with reference to FIG. 11, portions of the links 206 and 210 fit between the sidewalls 212S to provide a compact assembly 200. The first link 206 may be wider than the third link 210, such that, in the upright stowed position, the third link 210 fits within sidewalls 206S of the first link 206.

Figure 12:
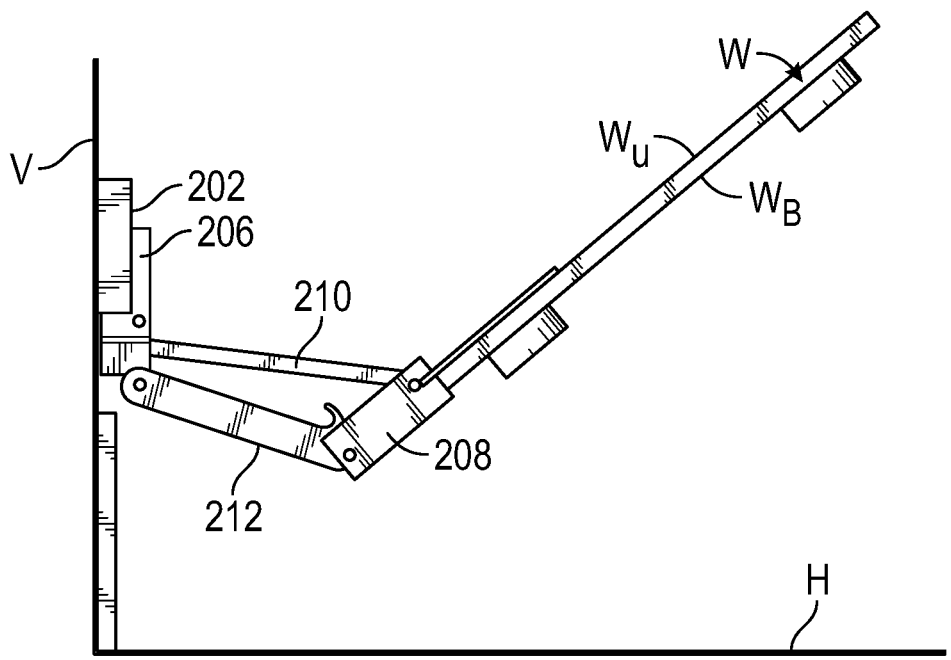
FIG. 12 illustrates a side view of the second example mounting assembly for a weighing device in a position between the down position and the upright stowed position.

FIG. 12 illustrates the assembly 200 at a position between the down and upright stowed positions. A force applied to the bottom surface $W_B$ of the weighing device W would move the assembly 200 toward the upright stowed position, while an absence of force to the bottom surface $W_B$ of the weighing device W would allow the assembly 200 to move to the down position, such that the weighing device W engages the horizontal surface W.

Figure 13:
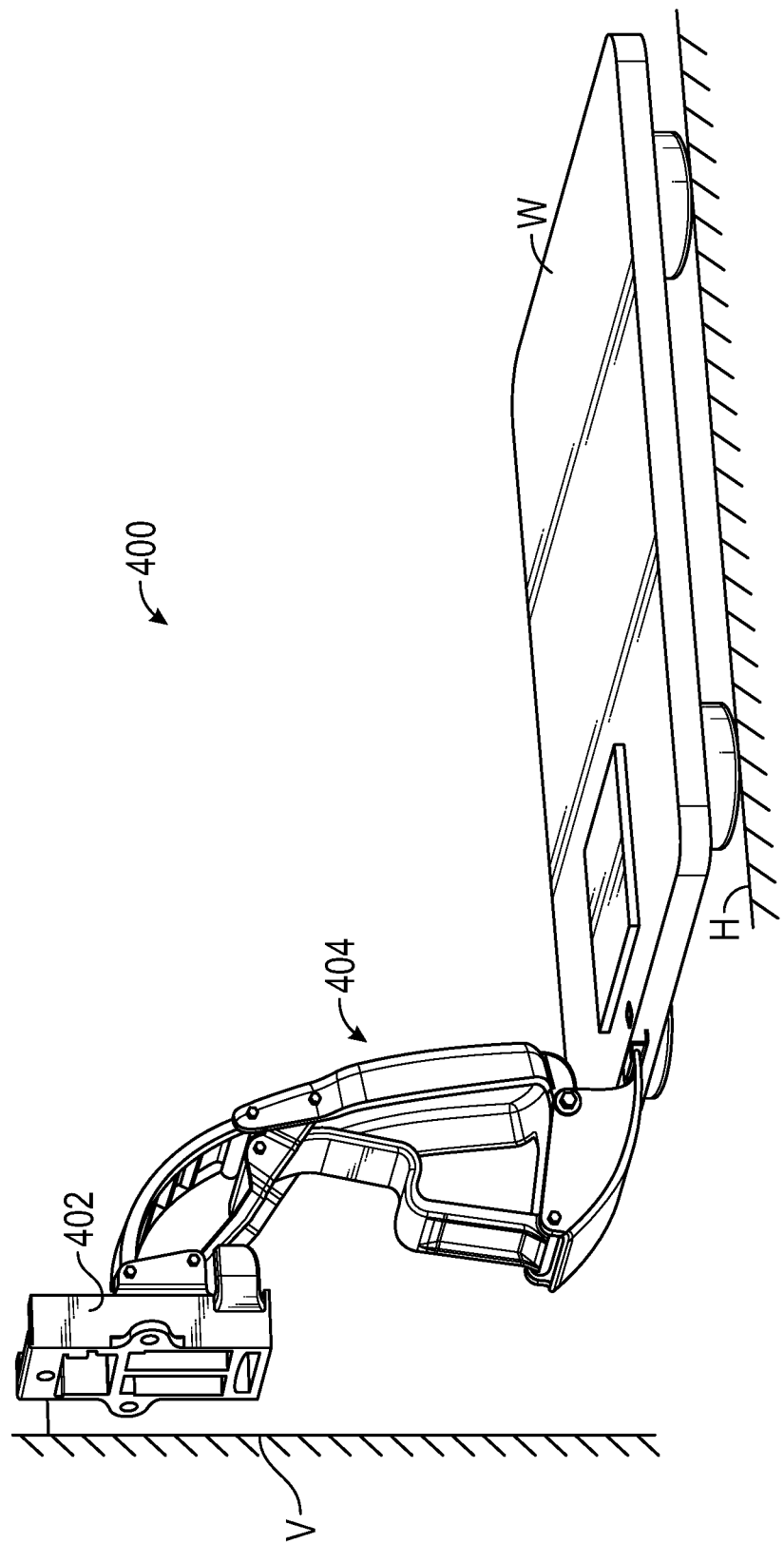
FIG. 13 is a perspective view of a third example mounting assembly for a weighing device.
Figure 14A:
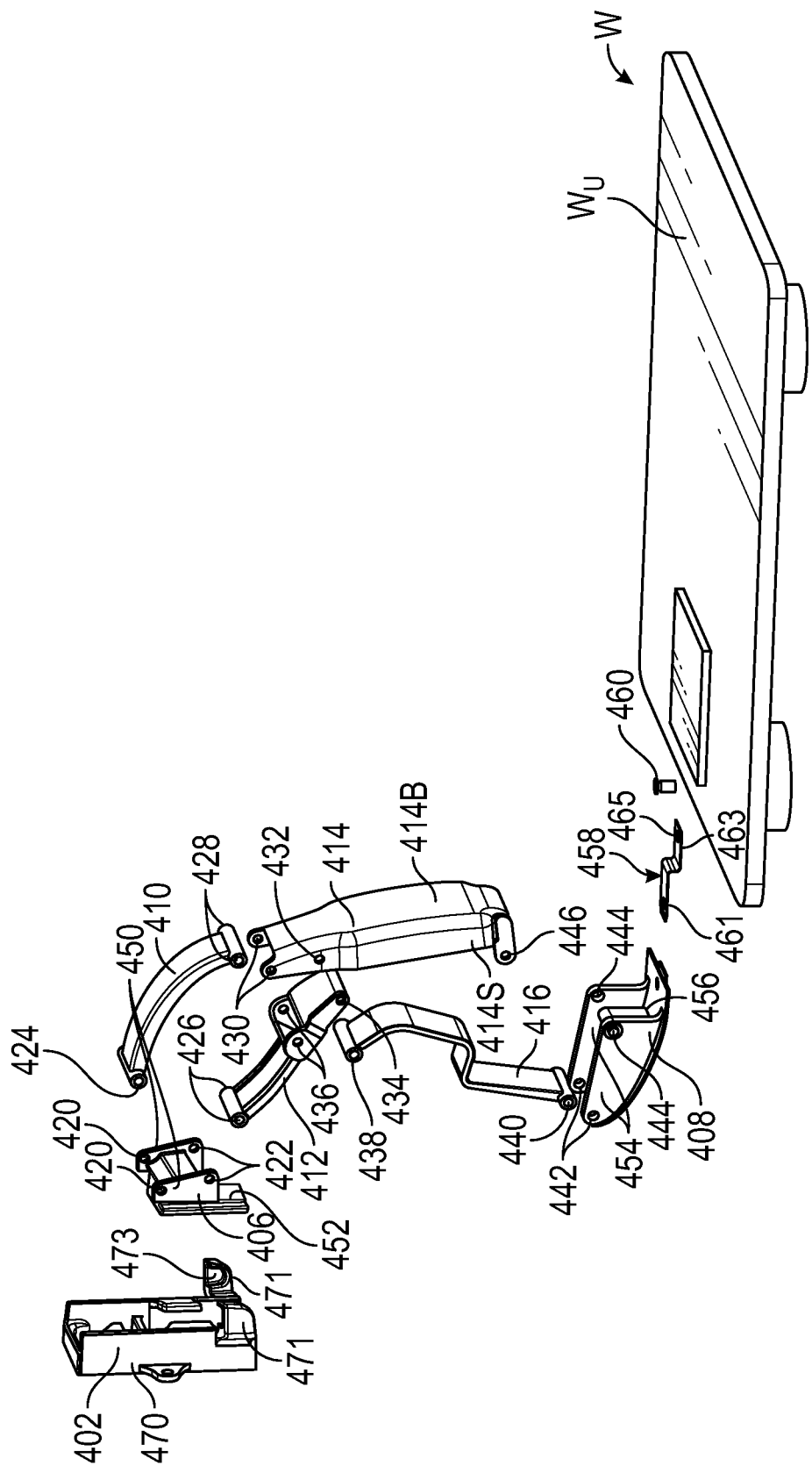
FIG. 14A is an exploded view of the third example mounting assembly for a weighing device.
Figure 14B:
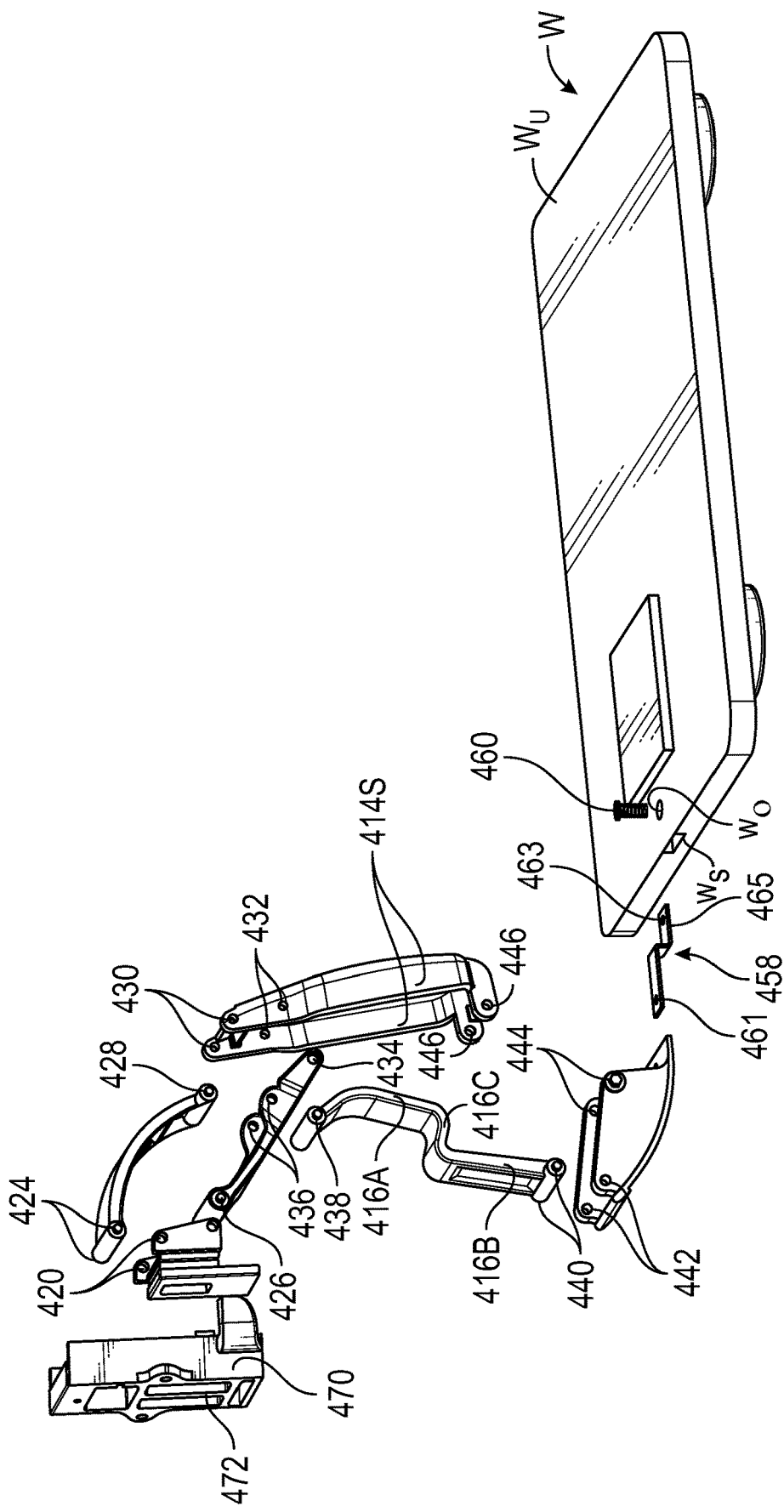
FIG. 14B is an exploded view of the third example mounting assembly for a weighing device.
Figure 15:
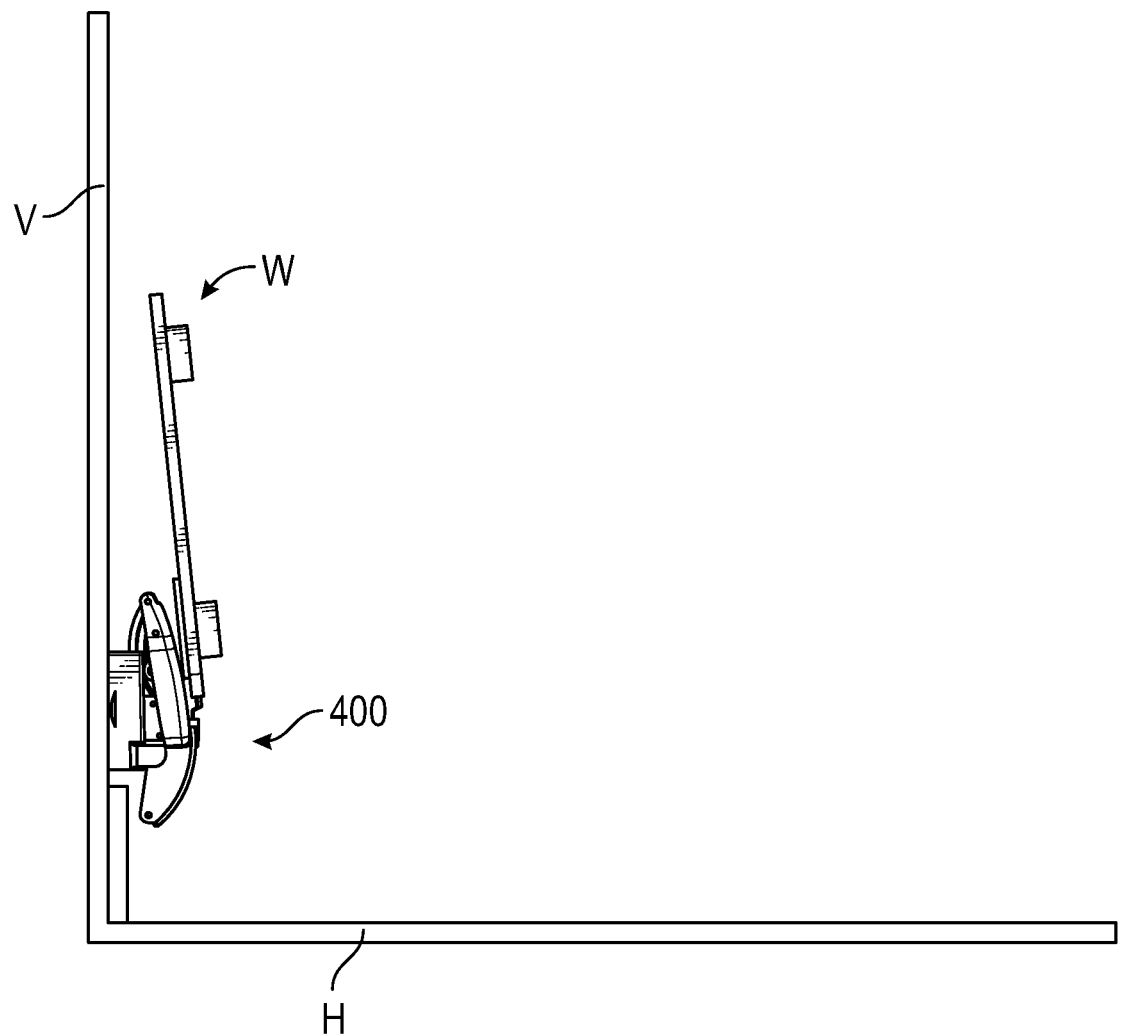
FIG. 15 is a side view of the third example mounting assembly for a weighing device in an upright position.

FIGS. 13-17 illustrate another example mounting assembly 400 for a weighing device W. Referring to FIG. 13, the assembly 400 includes a vertical structure mount 402 configured for attachment to a vertical structure V (shown schematically), one example being a surface of a wall. A mechanism 404 is fixed to the vertical structure mount 402 and to a weighing device W. The mechanism 404 is configured to guide the raising and lowering of the weighing device W from and to a horizontal surface H, one example being a floor, between a down position (shown) and an upright stowed position (FIG. 15).

Referring to FIGS. 13, 14A, and 14B, the mechanism 404 includes a first link 406 attached to the vertical structure mount 402. A second link 408 is configured for attachment to the weighing device W. A third link 410 is pivotably attached to the first link, and a fourth link 412 is pivotably attached to the first link 406.

A fifth link 414 is pivotably attached to the second link 408, and a sixth link 416 is pivotably attached to the second link 408. The third link 410 is pivotably attached to the fifth link 414, and the fourth link 412 is pivotably attached to the fifth link 414 and the sixth link 416. In some examples, the links 406, 408, 410, 412, 414, and 416 may be pivotably attached at pivot joints by rivets or pins. A person of ordinary skill in the art having the benefit of this disclosure would realize that other pivot joints may be utilized.

The weighing device W may be displaced a horizontal distance X along the horizontal surface H from the vertical structure V, and the vertical structure mount 402 may be displaced a vertical distance Y along the vertical structure V from the horizontal surface H. In one example, the values for X and Y are great enough such that the assembly 400 can clear a baseboard or other object on the vertical structure V. In one example, X is at least about 3 inches and Y is at least about 5 inches. The value for X may be great enough such that a user of the weighing device W is spaced an appropriate distance from the vertical structure V when using the weighing device W.

The first link 406 includes a first pair of openings 420 and a pair of openings 422. The pair of openings 420 are configured to align with a pair of openings 424 on the third link 410 to form a pivot joint for pivotal attachment. The pair of openings 422 are configured to align with a pair of openings 426 on the fourth link 412 to form a pivot joint for pivotal attachment. The third link 410 includes a pair of openings 428 configured to align with a pair of openings 430 on the fifth link 414 to form a pivot joint for pivotal attachment. The fifth link 414 includes a pair of openings 432 configured to align with a pair of openings 434 in the fourth link 412 to form a pivot joint for pivotal attachment. The fourth link includes a pair of openings 436 configured to align with a pair of openings 438 in the sixth link 416 to form a pivot joint for pivotal attachment. The sixth link 416 includes a pair of openings 440 configured to align with a pair of openings 442 in the second link 408 to form a pivot joint for pivotal attachment. The second link 408 includes a pair of openings 444 configured to align with a pair of openings 446 in the fifth link 414 to form a pivot joint for pivotal attachment.

The pair of openings 424 and the pair of openings 428 are located at opposite ends of the third link 410. The pair of openings 426 and the pair of openings 434 are located at opposite ends of the fourth link 412, with the pair of openings 436 located between the pair of openings 426 and the pair of openings 434. The pair of openings 430 and the pair of openings 446 are located at opposite ends of the fifth link 414, and the pair of openings 432 are located between the pair of openings 430 and the pair of openings 446. The pair of openings 438 and the pair of openings 440 are located at opposite ends of the sixth link 416. The pair of openings 420 are vertically above the pair of openings 422.

The first link 406 may include one or more sidewalls 450 spaced from, or, alternatively, extending from, a base wall 452. The end of the third link 410 having the openings 424 and the end of the fourth link 412 having the openings 426 are configured to be received between the sidewalls 450 of the first link 406, allowing for a compact assembly 400 in the upright stowed and down positions.

The second link 408 includes a plurality of sidewalls 454 extending from and substantially perpendicular to a base wall 456. The sidewalls 454 provide the openings 442 and 444. In one example, the second link 408 attaches to the weighing device W through a bracket 458 and a fastener 460, such as a screw or a bolt. The bracket 458 may attach at its first end 461 to the base wall 456 of the second link 408 and at its second end 463 to a slot $W_S$ in the weighing device W. The end 461 may be offset from the end 463. The fastener 460 may be receivable in an opening Wo in the upper surface $W_s$ of the weighing device W that extends to the slot $W_S$, such that the fastener can be received in an opening 465 in the end 463 of the bracket 458 to attach the second link 408, and in turn the mechanism 404 to the weighing device W. The slot $W_S$ in the example is at the back side of the weighing device W, but may alternatively be located at a side or front side of the weighing device W.

The bracket 458 may attach to the weighing device W and/or second link 408 through other attachment methods, including but not limiting to a snap-fit design. In some examples, the size and shape of the bracket 458 corresponds to its associated weighing device W, such that a variety of weighing devices W can be utilized with the assembly 400 by providing a customized bracket 458 for an associated weighing device W.

FIG. 15 shows the assembly 400 in the stowed upright position, in which the weighing device W is displaced vertically from the horizontal surface H, and the upper weighing surface Wu faces the vertical structure V. For example, the weighing device W may rotate from the down position to the upright stowed position to be parallel with the vertical structure V or rotate past a position parallel with the vertical structure V. As one example, the weighing device W may be 4 degrees past parallel with the vertical structure V in the upright stowed position. The assembly 400 may utilize a locking feature or features to maintain the assembly 400 in the stowed upright position.

Figure 16A:
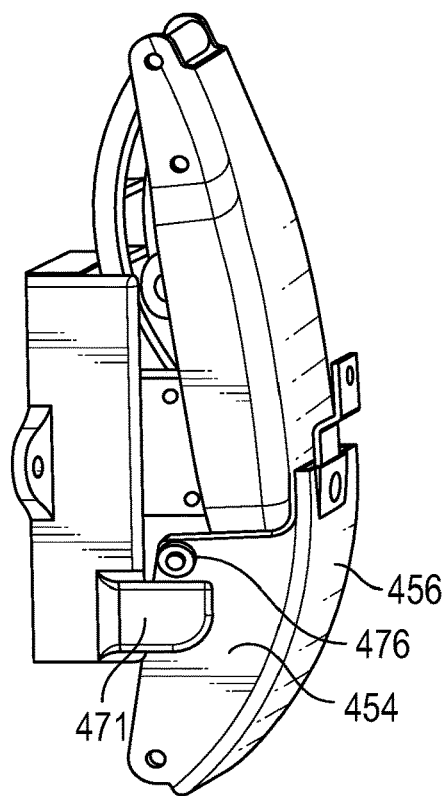
FIG. 16A illustrates a perspective view of the vertical structure mount and the mechanism of the third example mounting assembly for a weighing device in a disengaged position.
Figure 16B:
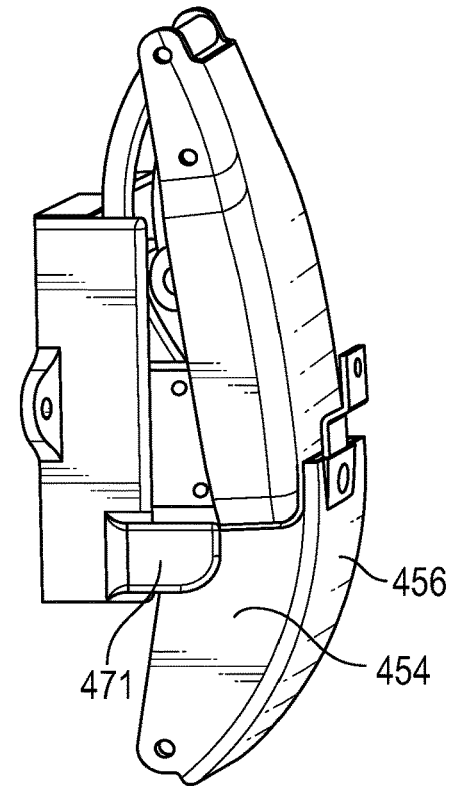
FIG. 16B illustrates a perspective view of the vertical structure mount and the mechanism of the third example mounting assembly for a weighing device in an engaged position.
Figure 16C:
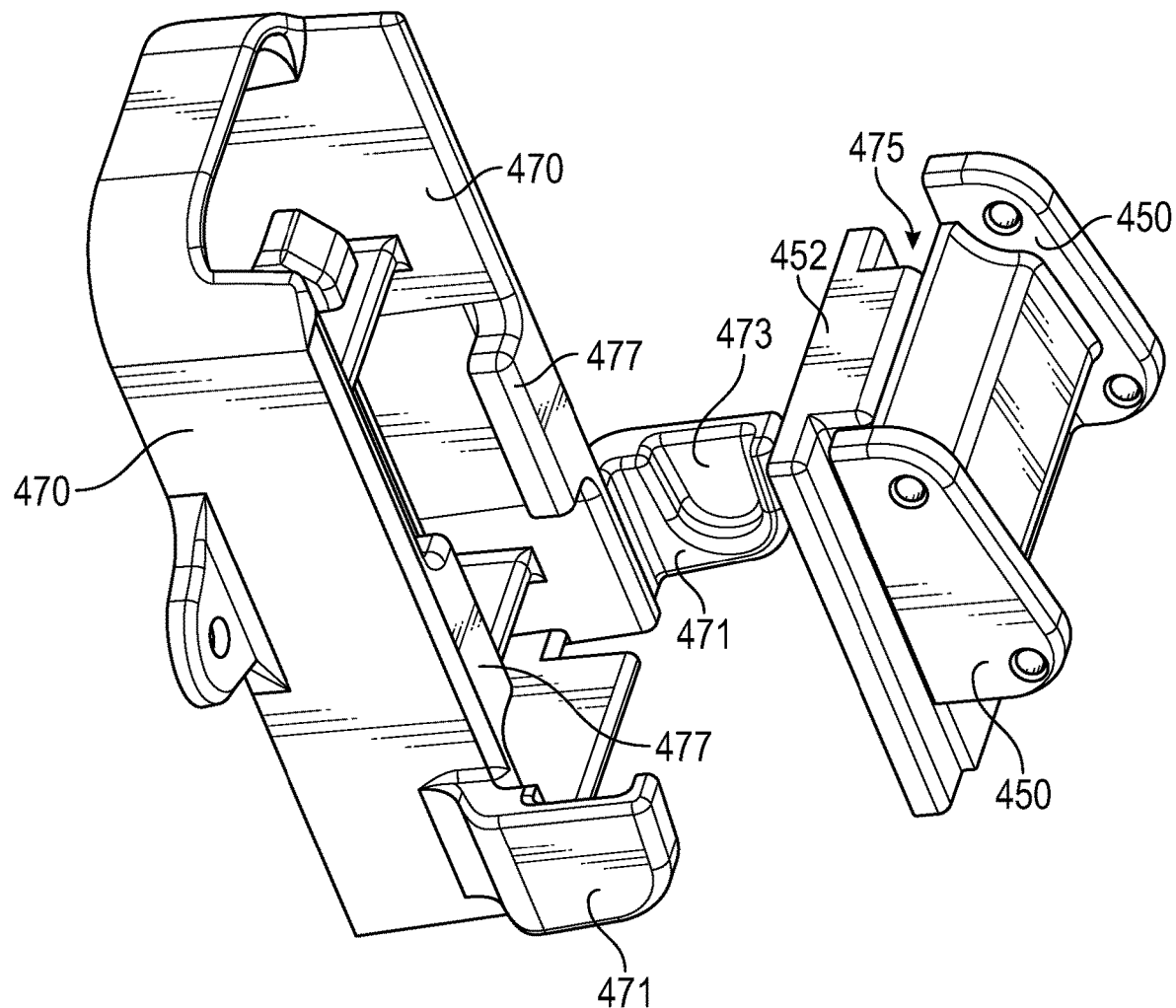
FIG. 16C illustrates an exploded view of an example vertical structure mount and first link.

Referring to FIGS. 16A, 16B, and 16C, as one example locking feature, the vertical structure mount 402 may include one or more extensions 471 providing slots 473, which are open at the top end of the extensions 471. In the example, the extensions 471 extend substantially parallel with the sidewalls 470. As one alternative, the extensions 471 may be planar with the sidewalls 470. The slots 473 are configured for engaging the mechanism 404 when the weighing device is in the vertical position. In the example, the first link 406 is vertically movable within the vertical structure mount 402. The sidewalls 450 of the first link 406 may be spaced from the base wall 452 such that slots 475 are provided therebetween. The slots 475 are configured to receive tabs 477 from the sidewalls 470 of the vertical structure mount 402, such that the first link 406 can move vertically within the vertical structure mount 402. In the example, the tabs 477 extend substantially perpendicular to the sidewalls 470. The vertical movability of the first link 406 may be used for engagement and disengagement of the mechanism 404 with the slots 473, one example of which is explained further below.

The vertical structure mount 402 may include one or more walls 470 extending from an engagement portion 472 configured to attach to the vertical structure V. The first link 406 is received within the vertical structure mount 402, such that the sidewalls 450 of the first link 406 are aligned with the walls 470 of the vertical structure mount 402. The extensions 471 are provided on or monolithic with the walls 470 and are opposite the walls 470 from the engagement portion 472.

FIG. 16A illustrates the mechanism 404 disengaged from the slots 473, and FIG. 16B illustrates the mechanism 404 engaged with the slots 473. The second link 408 includes extensions 476 configured to be received in the slots 473. In one example, the extensions 476 extend outward from sidewalls 454 of the second link 408 that extend from the base wall 456 of the second link 408. The extensions 476 may be substantially aligned with the pair of openings 444. In the engaged position, the extensions 476 are received against the bottom of the corresponding slot 473. The extension 471 and slot 473 may provide an upward force on the mechanism 404 in the engaged position. In another example, the second link 408 may include the slots and the vertical structure mount 402 may include the extensions. One of ordinary skill in the art having the benefit of this disclosure would recognize that other locking features, including, for example, those described in other embodiments herein, may be utilized.

An upward lifting force on the mechanism 404 results in vertical displacement of the first link 406 within the vertical structure mount 402, thereby causing the second link 408 to disengage from the slots 473 for movement of the weighing device W into the down position. In one example, the first link 406 is movable in the vertical direction by approximately ½ inch. This distance may be slightly greater than the vertical distance from bottom to the top of slot 473, to allow for clearance by the extension 476 when moving from the engaged to the disengaged position.

Figure 17:
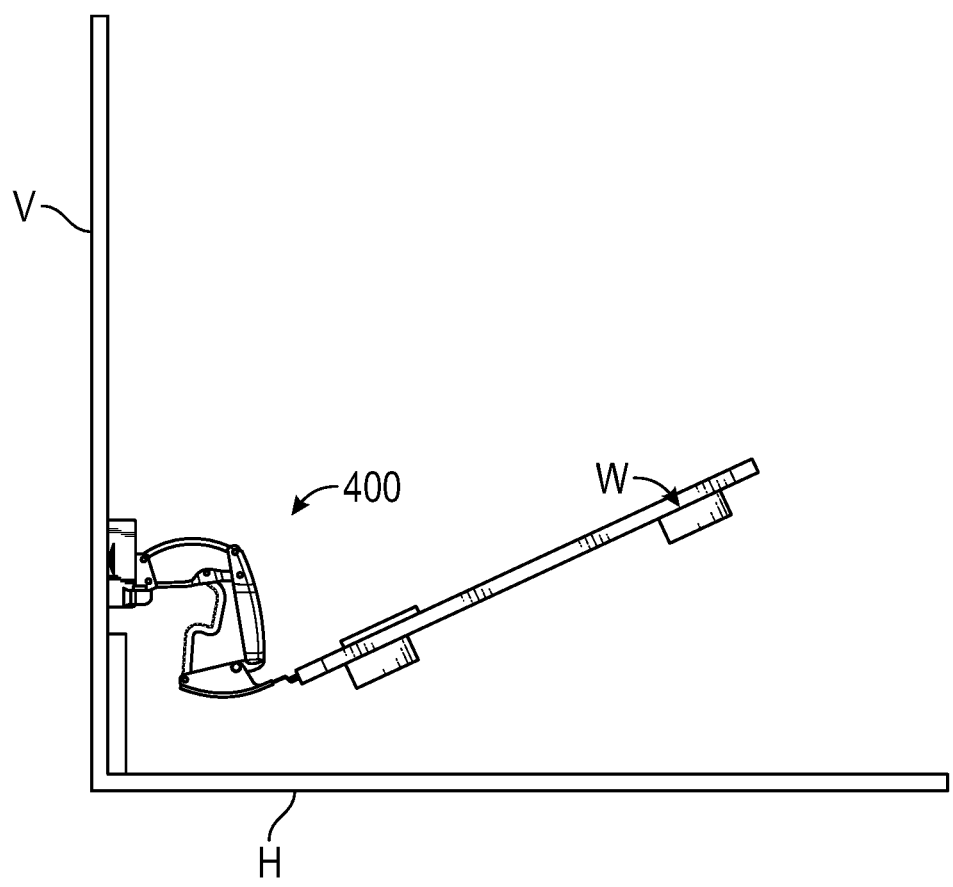
FIG. 17 illustrates a side view of the third example mounting assembly for a weighing device in a position between the down position and the upright stowed position.
Figure 18:
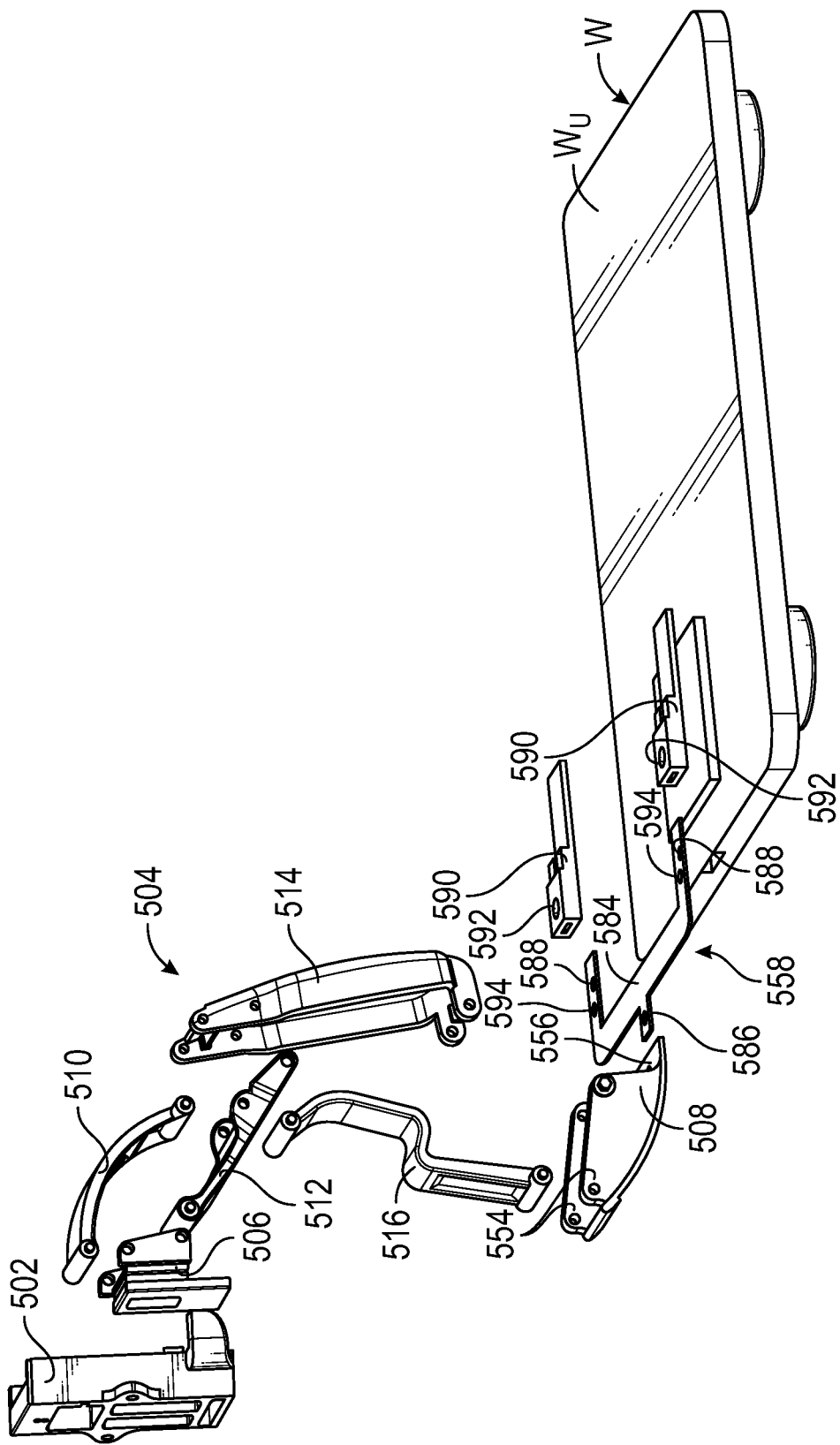
FIG. 18 is an exploded view of a fourth example mounting assembly for a weighing device
Figure 19:
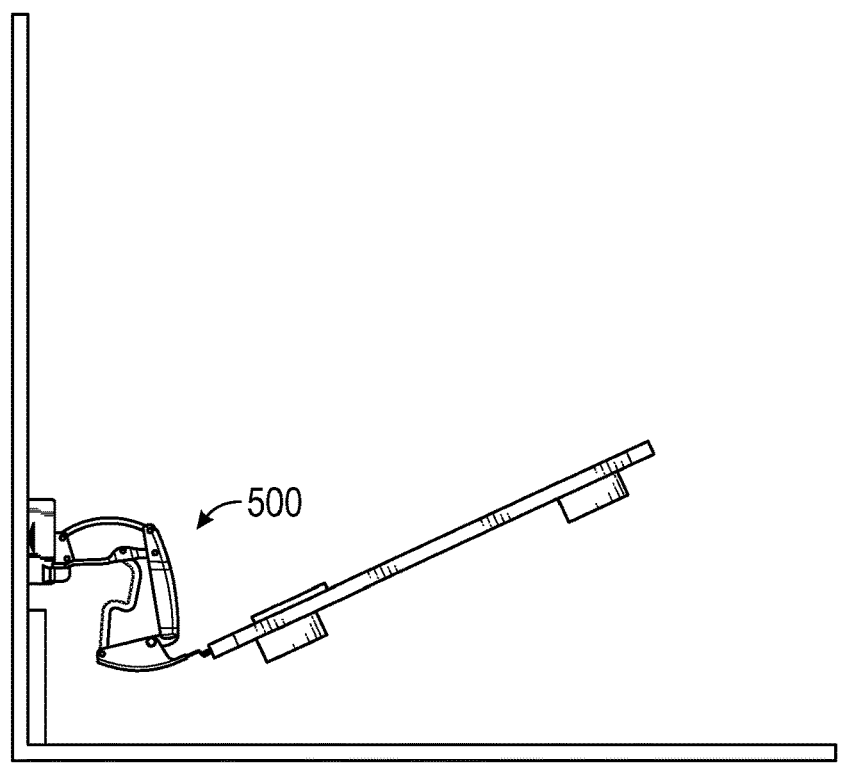
FIG. 19 illustrates a side view of the fourth example mounting assembly for a weighing device in a position between the down position and the upright stowed position.
Figure 20:
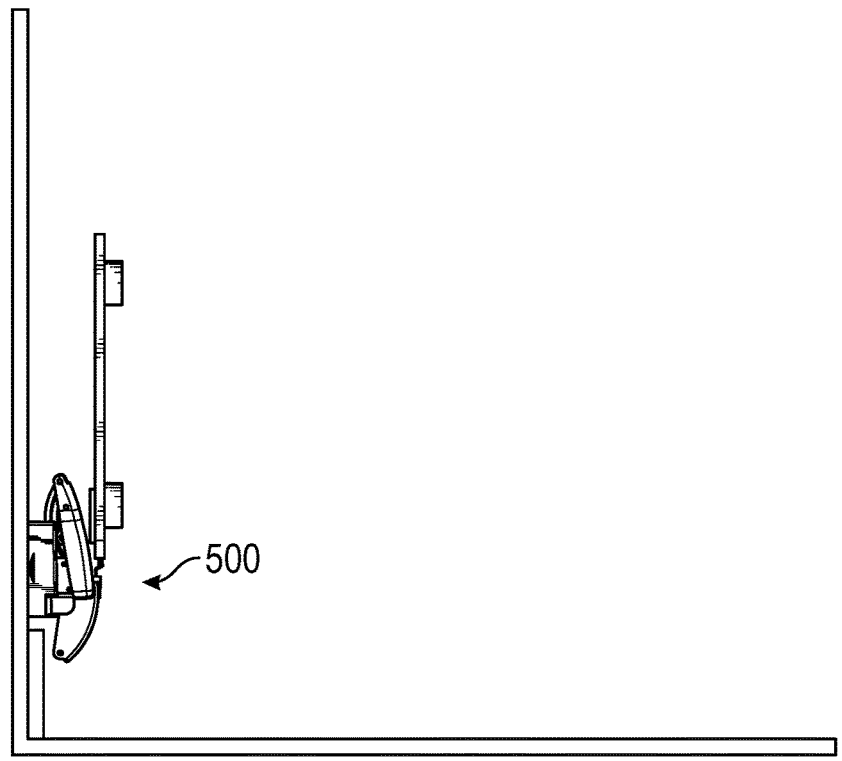
FIG. 20 illustrates a side view of the fourth example mounting assembly for a weighing device in the upright stowed position.
Figure 21A:
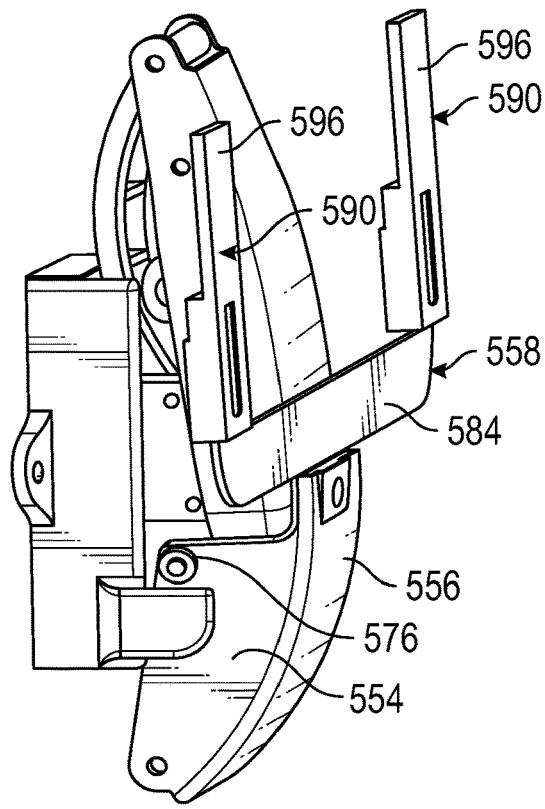
FIG. 21A illustrates a perspective view of the vertical structure mount and the mechanism of the fourth example mounting assembly for a weighing device in a disengaged position.
Figure 21B:
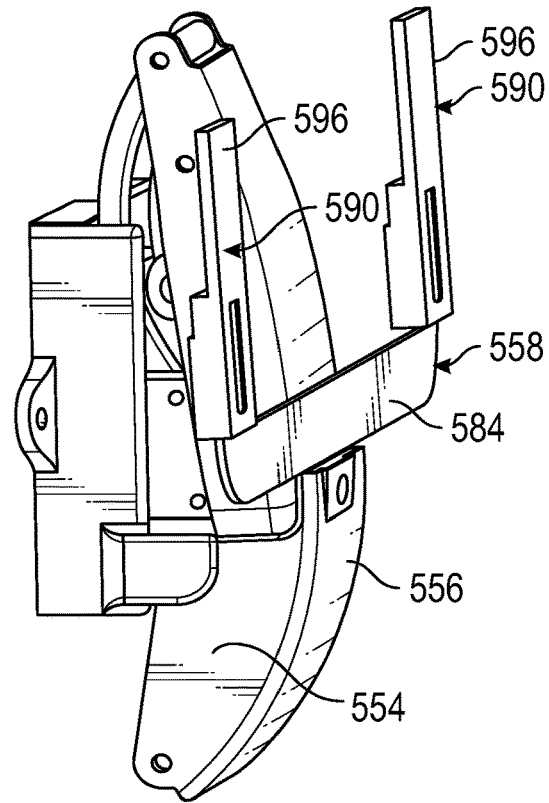
FIG. 21B illustrates a perspective view of the vertical structure mount and the mechanism of the fourth example mounting assembly for a weighing device in an engaged position.

FIG. 17 illustrates the assembly 400 at a position between the down and upright stowed positions. A force applied to the bottom surface $W_B$ of the weighing device W moves the assembly 400 toward the upright stowed position, while an absence of force to the bottom surface $W_B$ of the weighing device W would allow the assembly 400 to move to the down position, such that the weighing device W engages the horizontal surface W.

In the example, the fifth link 414 is wider than the links 410, 412, and 416. The fifth link 414 includes a base 414B and one or more sidewalls 414S extending from the base. The sidewalls 414S provide the pairs of openings 430, 432, 446. In the upright stowed position, with reference to FIG. 15, portions of the links 410, 412, and 416 fit between the sidewalls 414S to provide a compact assembly 400. The sixth link 416 includes a first portion 416A offset from a second portion 416B by a third portion 416C (see FIG. 14B). In the upright stowed position, the first portion 416A is configured to fit between the sidewalls 414S of the fifth link 414, while the third portion 416C provides clearance around the pivot joint provided by the pairs of openings 444, 446. The mechanism 404 is a compact assembly in the upright stowed position.

The links 406, 408, 410, 412, 414, 416 are configured to bear the weight of weighing device W when the assembly 400 is in the upright stowed position and each position between the upright stowed and down positions.

FIGS. 18-21B illustrate another example mounting assembly 500 for a weighing device W, as one alternative to the bracket 458 and fastener 460 arrangement of assembly 400. Like reference numerals represent like features.

In the assembly 500, the second link 508 is configured to receive a bracket 558 including an arm portion 584 transverse to an attachment portion 586 and two extensions 588 extending from the arm portion 584. The attachment portion 586 is configured to attach to the second link 508, and the extensions 588 are configured for attaching the bracket 558 to the weighing device W. In one example, the attachment portion 586 and the extensions 588 extend substantially parallel from the arm 584. The arm 584, attachment portion 586, and extensions 588 may be planar or may alternatively be offset from one another. The extensions 588 may be at opposite ends of the arm 584 from one another.

The extensions 588 may each be configured for attachment to an associated mounting feature 590. In one example, the mounting feature 590 includes an opening 592 configured for alignment with an opening 594 on the extension 588, such that the openings 592,594 may receive a fastener for attachment of the bracket 558 to the mounting features 590. One of ordinary skill in the art having the benefit of this disclosure would recognize that other methods for attaching the attaching the extensions 588 to the mounting feature 590, or for attaching the bracket 558 to the weighing device W, may be utilized.

The mounting features 590 may include, at the surface 596 opposite the mounting feature 590 from the extensions 588, adhesive for attachment of the mounting features 590 to the upper surface Wu of the weighing device W. As one alternative, the extensions 588 of the bracket 558 attach directly to the weighing device W through adhesive.

The assemblies 400/500 allow for the example brackets 458/558 to be interchangeable to allow for flexibility in attaching to a variety of weighing devices W. One of ordinary skill in the art having the benefit of this disclosure would recognize that the brackets 458/558 are exemplary, and other bracket shapes may be utilized for attaching the weighing device W to assemblies 400/500.

In some examples, the bottom surface $W_B$ of the weighing device W may receive decorative features, such as, for example, signage, logos, advertisements, artwork, etc., such that the decorative features are on display when the assembly 100/200/400/500 is in the upright stowed position.

Figure 22:
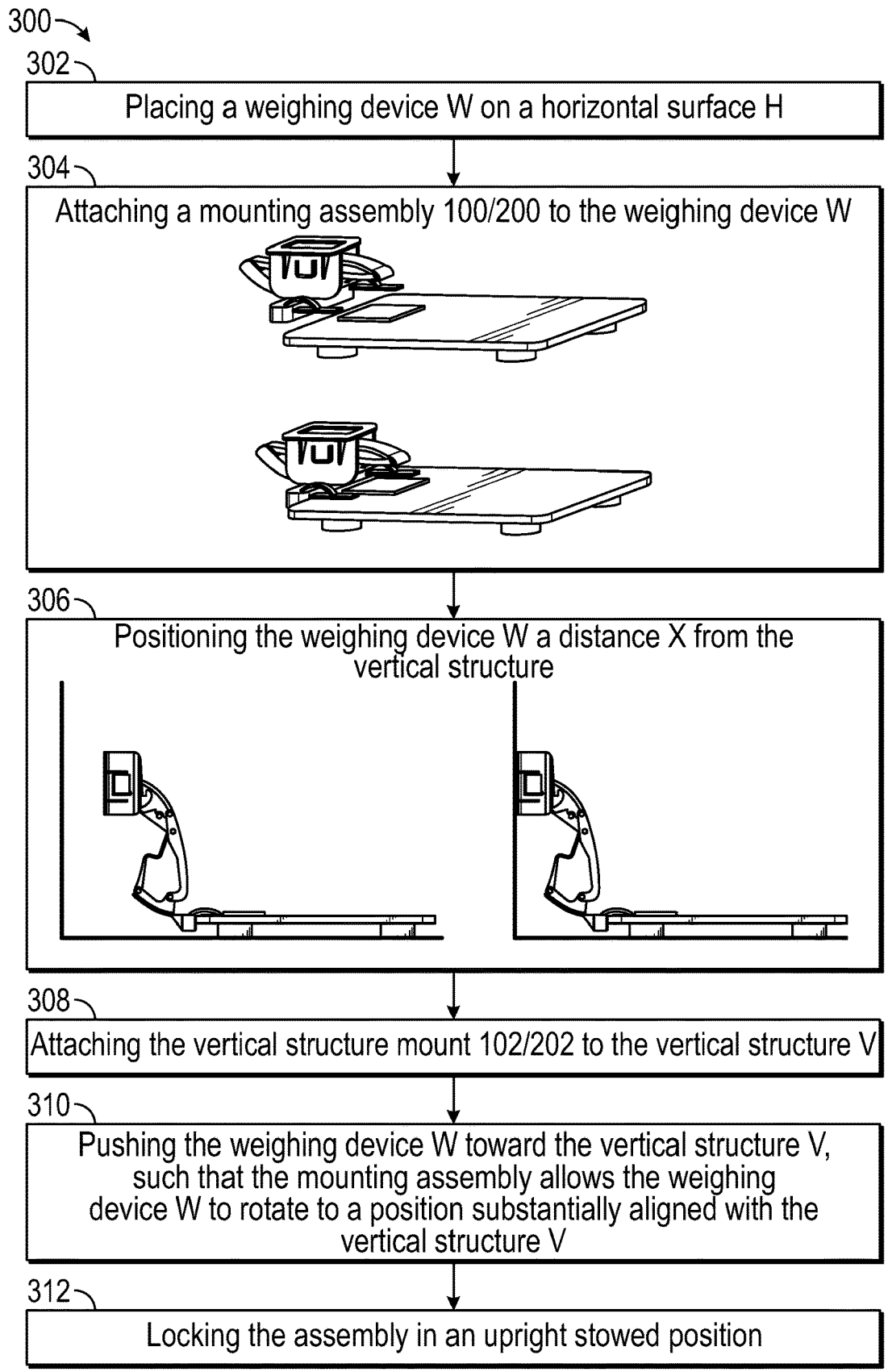
FIG. 22 is a flowchart representative of a method for mounting a weighing device to a vertical structure.

FIG. 22 illustrates a flow chart representative of a method 300 for mounting a weighing device W to a vertical structure V, for example, by using the mounting assemblies 100/200/400/500 disclosed herein. At 302, the method may include the step of placing a weighing device W on a horizontal surface H.

At 304, the method may further include the step of attaching a mounting assembly 100/200 to the weighing device W, wherein the mounting assembly 100/200 comprises a vertical structure mount 102/202/402/502, a first link 106/206/406/506 attached to the vertical structure mount 102/202/403/502, a second link 108/208/408/508 for attachment to the weighing device, a third link 110/210/410/510 pivotably attached to the first link 106/206/406/506, and a fourth link 112/212/412/512 pivotably attached to the first link 106/206/406/506. A fifth link 114/414/514 may be pivotably attached to the second link 108/408/508, and a sixth link 116/416/516 may be pivotably attached to the second link 108. As one example, the attaching the mounting assembly 100/200/500 to the weighing device W step 304 may include attaching the second link 108/208/508 to an upper weighing surface Wu of the weighing device W. The second link 108/208/508 may be attached to the upper weighing surface Wu with adhesive.

At 306, the method may further include positioning the weighing device W a distance X from the vertical structure. In one example the distance X is determined by placing the weighing device W on the horizontal surface H, extending the mechanism 104/204 to a fully extended position, and adjusting the position of the weighing device W on the horizontal surface H such that the vertical structure mount 102/202/402/502 abuts and is aligned with the vertical structure V with the weighing device W on the horizontal surface and the mechanism 104/204/404/504 in an extended position. In one example, in the extended position, the first link 106/206/406/506 is at its vertically lowest position within the vertical structure mount 102/202/402/502. In another example, the distance X may be a predetermined distance.

At 308, the method may further include the step of attaching the vertical structure mount 102/202/402/502 to the vertical structure V. The attaching the vertical structure mount 102/202/402/502 to the vertical structure V step 306 may be performed while the weighing device W is located on the horizontal surface H at the distance X from the vertical structure V, and the first link 106/206/406/506 is at its vertically lowest position within the vertical structure mount 102/202/406/506, to ensure that the vertical structure mount 102/202/402/502 is attached at the correct height. The attaching may be done with fasteners.

At 310, the method may further include the step of pushing the weighing device W toward the vertical structure V, such that the mounting assembly allows the weighing device W to rotate to a position substantially aligned with the vertical structure V. For example, the weighing device W may rotate from the down position to the upright stowed position to be parallel with the vertical structure V or rotate past a position parallel with the vertical structure V. In one example, the weighing device W is 4 degrees past parallel in the upright stowed position to allow for space saving.

At 312, the method may further include locking the assembly in an upright stowed position. As one example, the locking step 310 may include lifting a mechanism 104/204/404/504 relative to the vertical structure mount 102/202/402/502 to engage one or more slots 176 or bars 263 with one or more hooks 164/265 or slots 473/573 with extensions 476/576. The first link 106/206/406/506 may be at its vertically lowest point within the vertical structure mount 102/202/402/502 when the vertical structure mount 102/202/402/502 is attached to the vertical structure V to allow sufficient clearance for engagement and disengagement of the hooks 164 or extensions 476/576.

Figure 23:
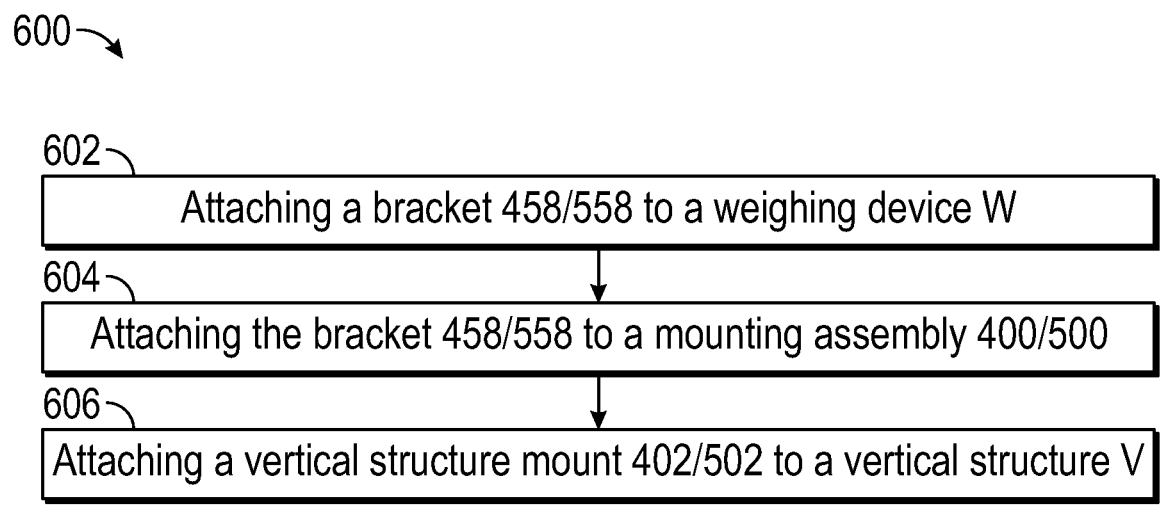
FIG. 23 is a flowchart representative of a second method for mounting a weighing device to a vertical structure.

FIG. 23 illustrates a flow chart representative of a method 600 for mounting a weighing device W to a vertical structure V, for example, by using the mounting assemblies 400/500 disclosed herein. At 602, a bracket 458/558 is attached to a weighing device W. At 604, the bracket 458/558 is attached to a mounting assembly 400/500. At 606, a vertical structure mount 402/502 is attached to the vertical structure V.

The method 600 may further include pushing the weighing device W toward the vertical structure V, such that the mounting assembly 400/500 allows the weighing device W to rotate to a position substantially aligned with the vertical structure V. The method 600 may further include placing the weighing device on a horizontal surface H. the method 600 may further include attaching a decorative feature to the bottom surface $W_B$ of the weighing device W.It should be understood that terms such as "vertical," "horizontal," "up," "down," and "upright" are used above with reference to the normal operational attitude of the assemblies 100/200/400/500. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A mounting assembly for a weighing device comprising:
   a vertical structure mount;

a first link attached to and vertically movable within the vertical structure mount;
a second link for attachment to the weighing device;
a third link pivotably attached to one of the first link and second link;
a fourth link pivotably attached to one of the first and second link; and
a bracket for attaching the second link to the weighing device.

2. The mounting assembly as recited in claim 1, comprising a fifth link pivotably attached to the second link.

3. The mounting assembly as recited in claim 2, comprising a sixth link pivotably attached to the second link.

4. The mounting assembly as recited in claim 3, wherein the third link is pivotably attached to the fifth link, and the fourth link is pivotably attached to the sixth link.

5. The mounting assembly as recited in claim 3, wherein the third link and fourth link are pivotably attached to the first link.

6. The mounting assembly as recited in claim 1, wherein the vertical structure mount is configured to be attached to a wall surface.

7. A method for mounting a weighing device to a vertical structure, the method comprising:
attaching a bracket to the weighing device;
attaching the bracket to a mounting assembly, wherein the mounting assembly comprises a vertical structure mount, a first link within the vertical structure mount, a second link for attachment to the weighing device, a third link pivotably attached to the first link, and a fourth link pivotably attached to the first link; and
attaching the vertical structure mount to the vertical structure.

8. The method as recited in claim 7, comprising:
pushing the weighing device toward the vertical structure, such that the mounting assembly allows the weighing device to rotate to a position substantially aligned with the vertical structure.

9. The method as recited in claim 7, comprising:
placing the weighing device on a horizontal surface.

10. The method as recited in claim 7, comprising:
lifting the assembly; and
lowering the assembly such that a locking feature is engaged, wherein the lifting and lowering cause vertical movement of the first link within the vertical structure mount.

11. A mounting assembly for a weighing device, comprising:
a vertical structure mount;
a first link attached to and vertically moveable within the vertical structure mount;
a second link for attachment to the weighing device;
a third link pivotably attached to the first link;
a fourth link pivotably attached to the first link;
a fifth link pivotably attached to the second link, wherein the third link is pivotably attached to the fifth link;
a sixth link pivotably attached to the second link, wherein the fourth link is pivotably attached to the sixth link; and
a locking feature configured to lock the weighing device in an upright position, wherein vertical movement of the first link within the vertical structure mount is configured to engage and disengage the locking feature.

12. The mounting assembly as recited in claim 11, comprising a bracket for attaching the second link to the weighing device.

13. The mounting assembly as recited in claim 11, wherein
the fifth link includes a base wall and a plurality of sidewalls extending from the basewall,
the sidewalls provide the pivotable attachments between the fifth link and the second link and the third link, and
at least portions of each of the second link, third link, and sixth link fit within the sidewalls when the assembly is in the upright position.

14. The mounting assembly as recited in claim 1, wherein the second link comprises an arm portion and an extension that extends from the arm portion and is configured to attach to the weighing device.

15. The mounting assembly as recited in claim 14, wherein the second link comprises a second extension that extends from the arm portion and is configured to attach to the weighing device.

16. The mounting assembly as recited in claim 15, wherein at least one of the extension and the second extension includes an adhesive pad for attachment to the weighing device.

17. The mounting assembly as recited in claim 16, comprising:
a fifth link pivotably attached to the second link; and
a sixth link pivotably attached to the second link.

18. The mounting assembly as recited in claim 1, comprising:
a locking feature configured to lock the weighing device in an upright position, wherein vertical movement of the first link within the vertical structure mount is configured to engage and disengage the locking feature.

19. The mounting assembly as recited in claim 18, wherein the locking feature includes at least one hook extending from the third link.

* * * * *